United States Patent
Saito

(10) Patent No.: US 12,024,858 B2
(45) Date of Patent: Jul. 2, 2024

(54) SHOVEL AND SHOVEL OPERATING DEVICE

(71) Applicant: SUMITOMO CONSTRUCTION MACHINERY CO., LTD., Tokyo (JP)

(72) Inventor: Daishi Saito, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 18/058,801

(22) Filed: Nov. 25, 2022

(65) Prior Publication Data

US 2023/0091890 A1     Mar. 23, 2023

Related U.S. Application Data

(63) Continuation of application No. PCT/JP2021/019847, filed on May 25, 2021.

(30) Foreign Application Priority Data

May 25, 2020    (JP) ................................ 2020-090917

(51) Int. Cl.
    *E02F 9/20*         (2006.01)
    *E02F 3/32*         (2006.01)
    *E02F 9/16*         (2006.01)

(52) U.S. Cl.
    CPC ............ *E02F 9/2004* (2013.01); *E02F 9/166* (2013.01); *E02F 3/32* (2013.01)

(58) Field of Classification Search
CPC ..... E02F 9/16; E02F 9/166; E02F 9/20; E02F 9/2012; E02F 9/2004; E02F 9/205; E02F 9/2246; E02F 9/268; E02F 3/32; E02F 3/435; B60K 2026/029; B60K 26/02; B60K 37/06; B60Y 2200/412; G05G 1/01; G05G 9/047
See application file for complete search history.

(56) References Cited

U.S. PATENT DOCUMENTS

| | | | |
|---|---|---|---|
| 5,664,637 A * | 9/1997 | Ohta | E02F 9/2004 180/286 |
| 5,938,282 A | 8/1999 | Epple | |
| 6,065,365 A | 5/2000 | Ostler et al. | |
| 6,450,284 B1 * | 9/2002 | Sakyo | E02F 9/26 340/684 |
| 7,721,839 B2 * | 5/2010 | Kim | B60N 2/797 180/326 |

(Continued)

FOREIGN PATENT DOCUMENTS

| | | |
|---|---|---|
| DE | 102004007055 | 7/2007 |
| EP | 3032371 | 6/2016 |

(Continued)

OTHER PUBLICATIONS

International Search Report for PCT/JP2021/019847 mailed on Aug. 10, 2021.

*Primary Examiner* — Laura Freedman
(74) *Attorney, Agent, or Firm* — IPUSA, PLLC

(57) ABSTRACT

A shovel includes a lower traveling body, an upper turning body turnably mounted on the lower traveling body, a cabin mounted on the upper turning body, an operator's seat installed in the cabin, an operating lever installed in the cabin, and a switch installed in the cabin, where the switch is disabled when the operating lever is operated.

16 Claims, 11 Drawing Sheets

(56) References Cited

U.S. PATENT DOCUMENTS

| | | | |
|---|---|---|---|
| 10,689,829 B2* | 6/2020 | Yamada | E02F 9/2296 |
| 11,041,290 B2* | 6/2021 | Kodaka | F15B 15/26 |
| 11,274,420 B2* | 3/2022 | An | E02F 9/2012 |
| 11,828,045 B2* | 11/2023 | Misaki | E02F 9/2267 |
| 11,913,194 B2* | 2/2024 | Sakuta | E02F 9/2083 |
| 11,913,197 B2* | 2/2024 | Fukuoka | E02F 9/26 |
| 2004/0154427 A1 | 8/2004 | Jo et al. | |
| 2010/0186533 A1* | 7/2010 | Akahane | G05G 5/005 74/483 R |
| 2015/0216118 A1 | 8/2015 | Swinney, II et al. | |
| 2016/0152278 A1 | 6/2016 | Kawashiri et al. | |
| 2021/0010233 A1* | 1/2021 | Ogata | A47C 7/54 |
| 2022/0290403 A1* | 9/2022 | Ogawa | E02F 3/325 |
| 2024/0011246 A1* | 1/2024 | Fukuoka | F02D 41/021 |
| 2024/0011252 A1* | 1/2024 | Onodera | E02F 9/20 |
| 2024/0018742 A1* | 1/2024 | Fukuoka | E02F 3/437 |
| 2024/0018749 A1* | 1/2024 | Fujikawa | G06F 3/04847 |
| 2024/0026654 A1* | 1/2024 | Satoh | E02F 9/26 |
| 2024/0035257 A1* | 2/2024 | Umeda | E02F 9/262 |

FOREIGN PATENT DOCUMENTS

| | | | | |
|---|---|---|---|---|
| JP | 08063248 A | * | 3/1996 | E02F 9/2004 |
| JP | 2000-264113 | | 9/2000 | |
| JP | 2001355473 A | * | 12/2001 | |
| JP | 2002070081 A | * | 3/2002 | |
| JP | 2004036664 A | * | 2/2004 | |
| JP | 2004210031 A | * | 7/2004 | |
| JP | 2004-245025 | | 9/2004 | |
| JP | 2004278208 A | * | 10/2004 | E02F 9/2004 |
| JP | 2004-316279 | | 11/2004 | |
| JP | 2013-249712 | | 12/2013 | |
| JP | 2015-024691 | | 2/2015 | |
| JP | 2018017034 A | * | 2/2018 | |
| JP | 2018-048530 | | 3/2018 | |
| WO | 2005077701 | | 8/2005 | |

* cited by examiner

SHOVEL AND SHOVEL OPERATING DEVICE

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2021/019847, filed on May 25, 2021, and designating the U.S., which claims priority to Japanese Patent Application No. 2020-090917 filed on May 25, 2020. The entire contents of the foregoing applications are incorporated herein by reference.

BACKGROUND

Technical Field

The present disclosure relates to a shovel and a shovel operating device.

Description of Related Art

Typically, shovels with operating levers installed on both sides of an operator's seat and switches installed around the operating levers are known

SUMMARY

According to an embodiment of the present invention, a shovel includes a lower traveling body, an upper turning body turnably mounted on the lower traveling body, a cabin mounted on the upper turning body, an operator's seat installed in the cabin, an operating lever installed in the cabin, and a switch installed in the cabin, where the switch is disabled when the operating lever is operated.

DETAILED DESCRIPTION

Typically, shovels with operating levers installed on both sides of an operator's seat and switches installed around the operating levers are known.

In such shovels, the switches are placed near the operating levers such that an operator can operate the switches without changing his or her upper body posture. However, in such a configuration, when the operator operates the operating levers, a part of the operator's body may touch the switches, causing the switches to be mis-operated despite the operator having no intention to operate the switches. Thus, the prevention of mis-operation of the switches is desired.

According to an embodiment, it is desired to provide a shovel described that is capable of preventing mis-operation of a switch.

Embodiments will be described below with reference to the accompanying drawings. In order to facilitate the understanding of the description, identical components in each drawing are given identical symbols, and overlapping descriptions are omitted.

In the accompanying drawings, an X-axis, a Y-axis, and a Z-axis are axes orthogonal to each other. Specifically, the X-axis extends along the depth (front-back) axis of the shovel, the Y-axis extends along the width (left-right) axis of the shovel, and the Z-axis extends along the turning axis of the shovel. In the present embodiment, the X and Y axes extend horizontally and the Z axis extends vertically.

Figure 1:
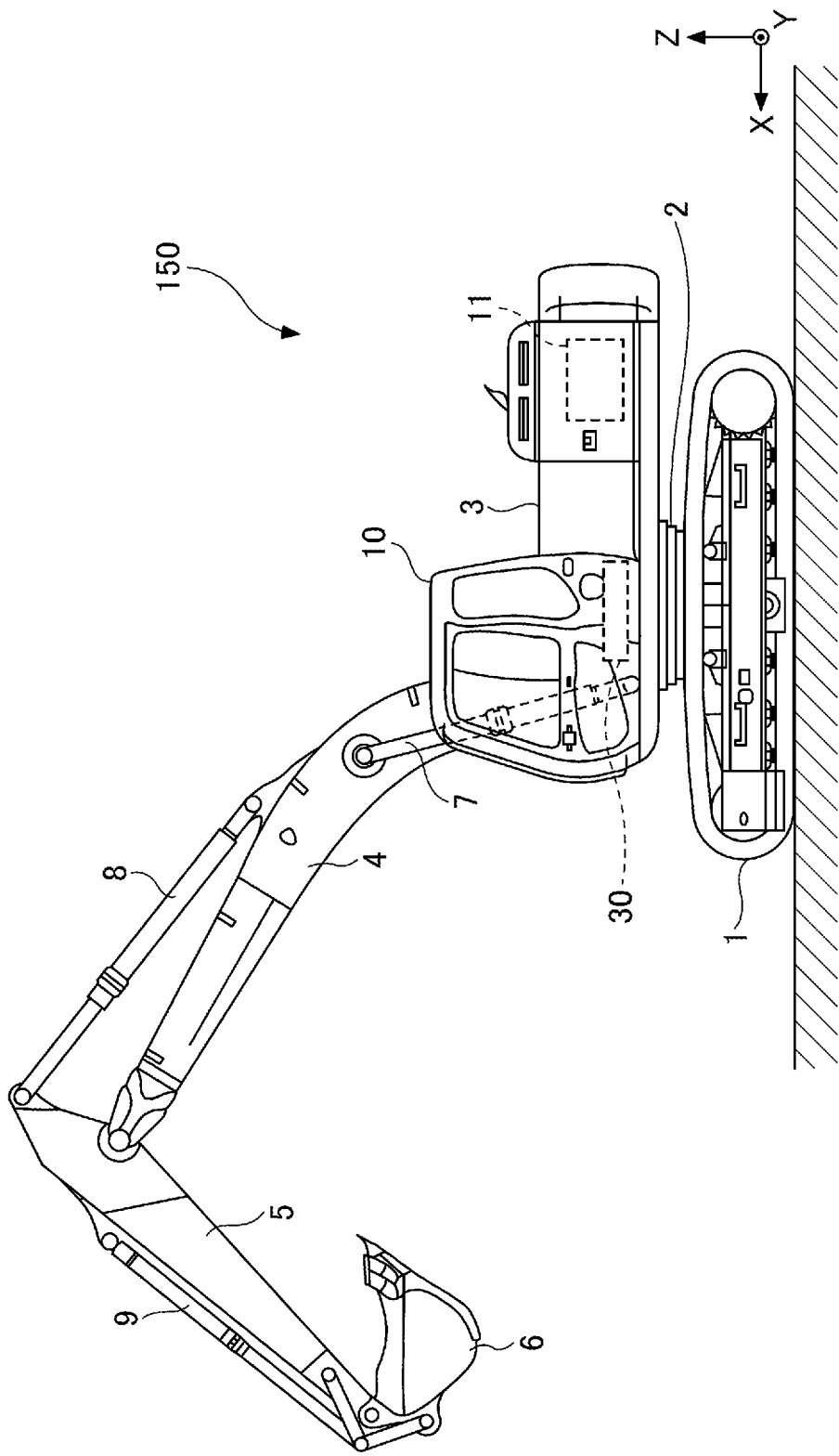
FIG. 1 is a side view illustrating a shovel according to an embodiment of the present invention.

First, an overall configuration of a shovel 150 as an excavating machine according to an embodiment of the present invention is described with reference to FIG. 1. FIG. 1 is a side view illustrating the shovel 150.

As illustrated in FIG. 1, an upper turning body 3 is mounted on a lower traveling body 1 of the shovel 150 so as to be able to turn through a turning mechanism 2. A boom 4 is attached to the upper turning body 3. An arm 5 is attached to the tip of the boom 4, and a bucket 6 as an end attachment is attached to the tip of an arm 5. The boom 4, the arm 5, and the bucket 6 constitute an excavator attachment as an example of an attachment. The boom 4 is driven by a boom cylinder 7, the arm 5 is driven by an arm cylinder 8, and the bucket 6 is driven by a bucket cylinder 9. The upper turning body 3 is provided with a cabin 10, which is a cab, and is equipped with a power source such as an engine 11.

A controller 30 is installed in the cabin 10. In the present embodiment, the controller 30 functions as a control device configured to perform drive control of the shovel 150. However, the controller 30 may be a control device specialized to implement specific functions. Specifically, the controller 30 is composed of a computer including processors such as a CPU, and memory such as a RAM and a ROM. Various functions of the controller 30 may be provided, for example, by the CPU executing programs stored in the ROM.

Figure 2:
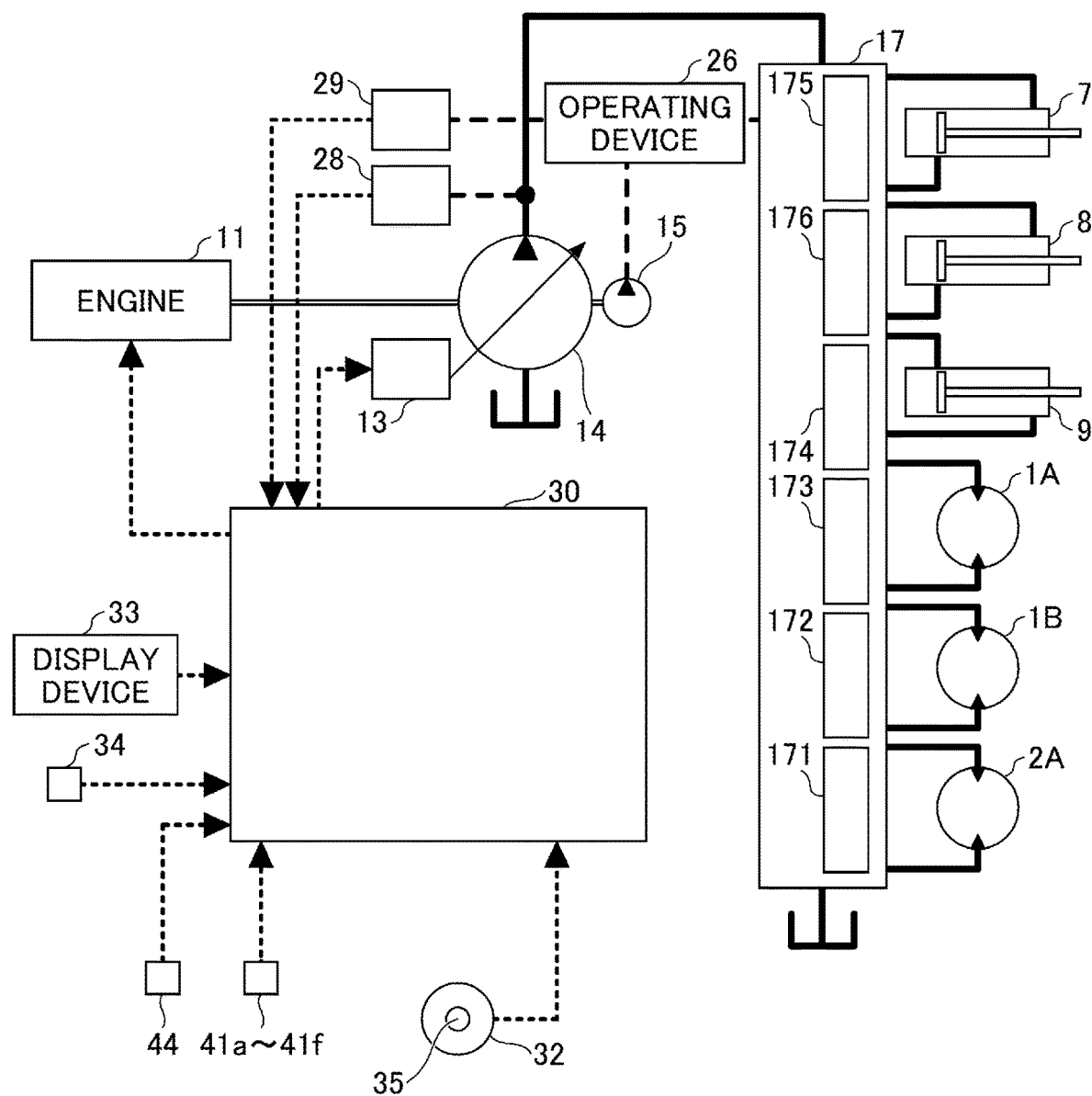
FIG. 2 is a diagram illustrating an example of a configuration of a shovel drive system in FIG. 1.

Next, a drive system of the shovel 150 will be described with reference to FIG. 2. FIG. 2 is a diagram illustrating an example of a configuration of the drive system of the shovel 150. In FIG. 2, mechanical power transmission lines, hydraulic oil lines, pilot lines, and electrical signal lines are illustrated as double, thick solid, dashed, and dotted lines, respectively.

As illustrated in FIG. 2, the drive system of the shovel 150 mainly includes an engine 11, a regulator 13, a main pump 14, a pilot pump 15, a control valve unit 17, an operating device 26, a discharge pressure sensor 28, an operation pressure sensor 29, a controller 30, a dial 32, a display device 33, switches 34, a switch 35, switches 41*a* to 41*f*, rocker switches 44, etc.

The engine 11 is a driving source of the shovel 150. In the present embodiment, the engine 11 is a diesel engine that operates to maintain a predetermined target speed. An output shaft of the engine 11 is connected to respective input shafts of the main pump 14 and the pilot pump 15.

The main pump 14 is configured to supply a hydraulic fluid to the control valve unit 17 via a hydraulic fluid line. In the present embodiment, the main pump 14 is a swashplate type variable displacement hydraulic pump.

The regulator 13 is configured to control a discharge amount of the main pump 14. In the present embodiment, the regulator 13 controls the discharge amount of the main pump 14 by adjusting a swashplate tilt angle of the main pump 14 in response to a control command from the controller 30.

The pilot pump 15 is configured to supply a hydraulic fluid to the operating device 26, etc., via a pilot line. In the present embodiment, the pilot pump 15 is a fixed displacement hydraulic pump.

The pilot pump 15 may be omitted. In such a case, functions provided by the pilot pump 15 may be provided by the main pump 14. That is, apart from the function of supplying the hydraulic fluid to the control valve unit 17, the main pump 14 may have a function of supplying the hydraulic fluid to the operating device 26, etc., after the pressure of the hydraulic fluid is reduced by drawing, etc.

The control valve unit 17 is configured to control the flow of hydraulic fluid in the hydraulic system mounted on the shovel 150. In the present embodiment, the control valve unit 17 includes control valves 171 to 176. The control valve unit 17 is configured to selectively supply a hydraulic fluid discharged by the main pump 14 to one or more hydraulic actuators through the control valves 171 to 176. Each of the control valves 171 to 176 is configured to control a flow rate of hydraulic fluid flowing from the main pump 14 to the hydraulic actuator and a flow rate of hydraulic fluid flowing from the hydraulic actuator to a hydraulic fluid tank. The hydraulic actuators include a boom cylinder 7, an arm cylinder 8, a bucket cylinder 9, a left traveling hydraulic motor 1A, a right traveling hydraulic motor 1B, and a turning hydraulic motor 2A.

The operating device 26 is a device used by the operator to operate the hydraulic actuators. In the present embodiment, the operating device 26 is configured to supply a hydraulic fluid discharged by the pilot pump 15 to a pilot port of a control valve corresponding to each of the hydraulic actuators via a pilot line. The pressure of the hydraulic fluid supplied to the pilot port (pilot pressure) is a pressure according to the operating direction and operating amount of the operating device 26.

The operating device 26 may be an electric operating device. In this case, the electric operating device is configured to output an electric signal corresponding to the operating amount to the controller 30. The operating amount of an operating lever acting as an electric operating device may be derived based on the output of other sensors such as sensors that detect the tilt angle of the operating lever. A solenoid valve is also disposed between the pilot pump 15 and each pilot port of the control valves 171 to 176. The solenoid valve is configured to operate according to electrical signals from the controller 30. This configuration enables the controller 30 to move, when the electric operating device is operated, each of the control valves 171 to 176 in the control valve unit 17 by controlling the solenoid valve to increase or decrease the pilot pressure according to an electrical signal corresponding to the operating amount. Each of the control valves 171 to 176 may be composed of an electromagnetic spool valve. In this case, the electromagnetic spool valve operates according to an electrical signal from the controller 30 corresponding to the operating amount of the electric operating device.

The discharge pressure sensor 28 is configured to detect a discharge pressure of the main pump 14. In the present embodiment, the discharge pressure sensor 28 outputs a detected value to the controller 30.

The operation pressure sensor 29 is an example of an operating content detection device and is configured to detect an operating content performed by an operator using the operating device 26. In the present embodiment, the operation pressure sensor 29 detects an operating direction and an operating amount of the operating device 26 corresponding to each of the hydraulic actuators in the form of pressure (pilot pressure), and outputs the detected value to the controller 30. However, the operating content of the operating device 26 may be detected using other sensors other than the operation pressure sensor 29. The dial 32 is a rotary knob (dial switch) used by the operator to select a target speed of the engine 11. The operator can adjust the target speed of the engine 11 by rotating the dial 32. The dial 32 is provided with a switch 35, so that the operator can switch output characteristics of the shovel 150 by depressing the switch 35.

Specifically, the operator can select one of the multiple target rotational speeds by rotating the dial 32. The dial 32 is configured to transmit information indicating a setting status of the target speed of the engine 11 to the controller 30. In the present embodiment, the dial 32 is configured such that the target speed can be switched in 10 steps from the first level (the level corresponding to the lowest target speed) to the 10th level (the level corresponding to the highest target speed). The actual speed of the engine 11 is controlled to be a target speed selected by the dial 32. The target speed value used at each level may be configured to be changeable.

Also, in the present embodiment, the dial 32 is configured to rotate without limit. That is, the dial 32 is not provided with a physical rotation stop such as a stopper in either the clockwise or counterclockwise direction. In addition, neither a rotating portion nor a non-rotating portion of the dial 32 is provided with a scale to identify each of the first to the 10th levels, nor is it provided with a mark (e.g., an arrow) indicating the present level (rotating position). That is, the operator is unable to check which one of the first level to the 10th level is selected by simply looking at the dial 32. The dial 32 may be configured such that a click feeling is obtained every time the operator rotates the dial 32 by a predetermined angle. This configuration enables the operator to increase the level by, for example, rotating the dial 32 clockwise to the 5th level, the 6th level, and so on, and to continue rotating the dial 32 clockwise even after reaching the 10th level. However, once the 10th level is reached, the selected level is maintained at the 10th level even if the operator continues rotating the dial 32 clockwise. In addition, since there is no scale or mark, no matter how much the dial 32 is rotated, there is no occurrence of a state in which the first level is indicated by a scale and a mark regardless of the current level not being the first level.

The operator can also switch the output characteristics of the shovel 150 between, for example, normal characteristics and fuel-efficient characteristics by depressing the switch 35. The fuel-efficient characteristics are output characteristics selected when the operator is desired to operate the shovel 150 with low fuel consumption. When the fuel-efficient characteristics are selected, the movement of the hydraulic actuators in response to the operation of the operating device 26 becomes more moderate. Therefore, the operator can operate the hydraulic actuators precisely to improve the safety of the work. Also, the operator can operate the shovel 150 with low noise.

When the fuel-efficient characteristics are selected, the controller 30 controls the engine 11 so as to provide output characteristics of the engine 11 that are different from the output characteristics of the engine 11 when the normal characteristics are selected. Such output characteristics may, for example, include a characteristic representing a relationship between the engine speed and torque of the engine 11.

For example, when the fuel-efficient characteristics are selected, the controller 30 may control the engine 11 to reduce torque. Alternatively, the controller 30 may reduce the target speed without changing the output characteristics of the engine 11 when the fuel-efficient characteristics are selected. In such a case, the controller 30 may reduce the target speed corresponding to each level selectable by rotating the dial 32 by a predetermined range.

For example, in a configuration in which, when the switch 35 is not depressed, the target speed set when the 10th level is selected is greater than the target speed set when the 9th level is selected, the predetermined range (drop range) may be the same for the 9th level and the 10th level. In this case, the target speed set by depression of the switch 35 when the 10th level is selected is greater than the target speed set by depression of the switch 35 when the 9th level is selected. However, the predetermined range (drop range) may be set to be larger at the 10th level than at the 9th level. In this case, the target speed set by depression of the switch 35 when the 10th level is selected may be the same as the target speed set by depression of the switch 35 when the 9th level is selected. The same applies to relationships of other levels apart from the 10th level and the 9th level.

The maximum target speed that can be set when the fuel-efficient characteristics are selected may also be limited to be lower than the maximum target speed that can be set when the normal characteristics are selected.

Thus, when the fuel-efficient characteristics are selected, the controller 30 can control the engine 11 to operate the shovel 150 more fuel-efficiently than when the normal characteristics are selected.

Specifically, information relating to the target speed of the engine 11 is input to the controller 30 from the dial 32 at a predetermined timing. In addition, information relating to the output characteristics of the shovel 150 (engine 11) is input to the controller 30 from the switch 35 at a predetermined timing. The controller 30 controls the speed of the engine 11 based on the information relating to the target speed input from the dial 32 and the information relating to the output characteristics of the shovel 150 (engine 11) input from the switch 35.

Various information is also input to the controller 30 from the switches 34, the switches 41a to 41f, the rocker switches 44, etc.

Figure 3:
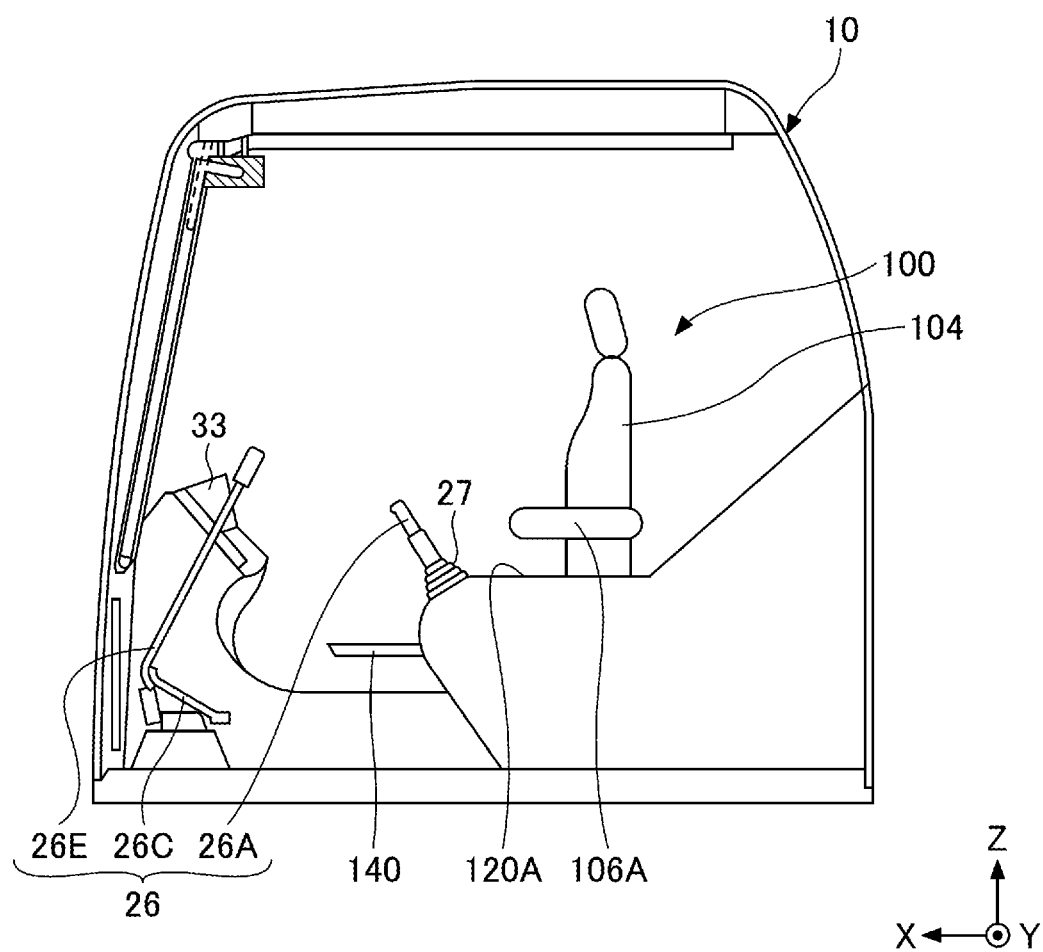
FIG. 3 is a left view illustrating an interior of a cabin.
Figure 4:
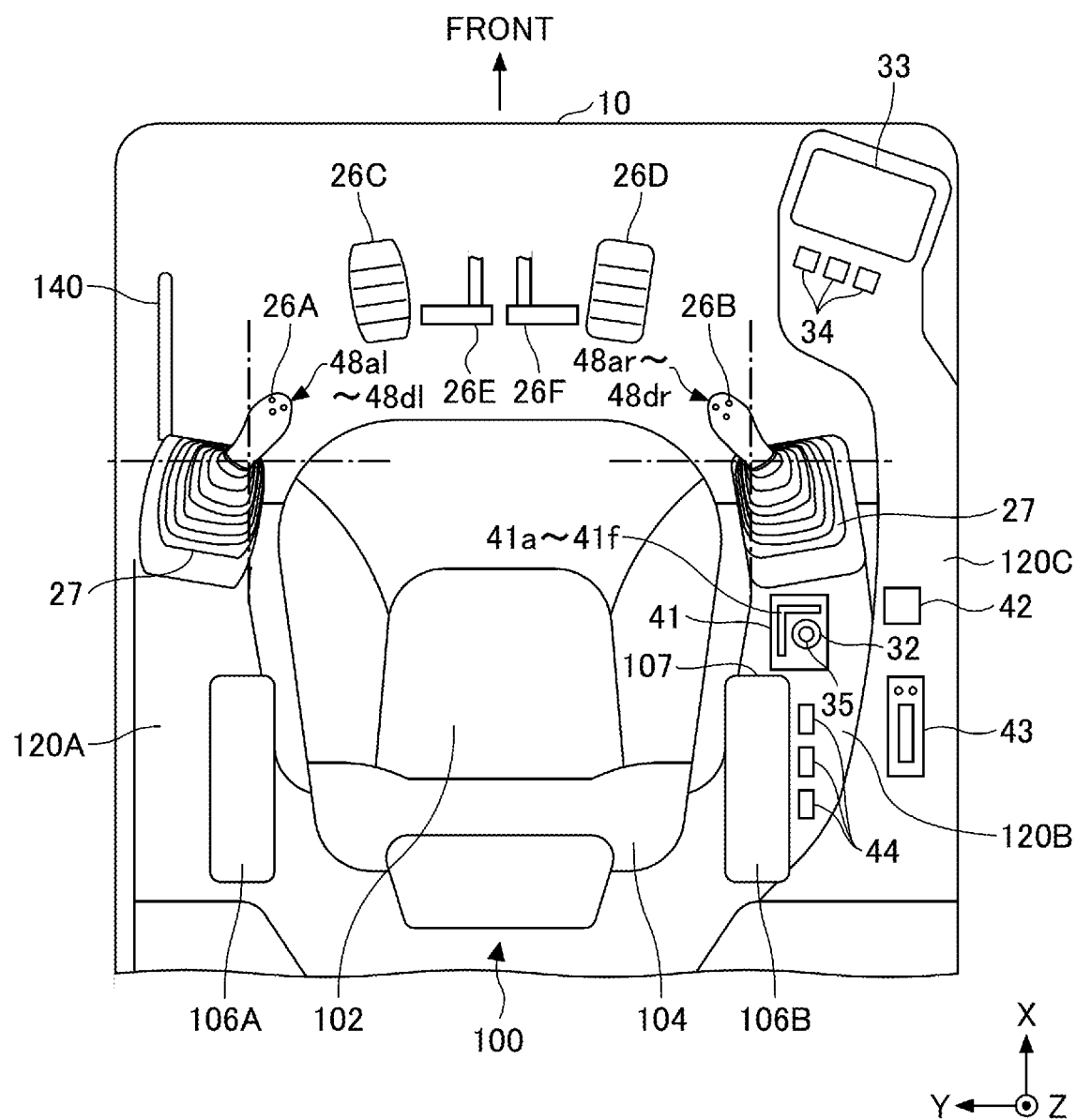
FIG. 4 is a top view illustrating the interior of the cabin.

Next, referring to FIGS. 3 and 4, an operator's seat 100 and the operating device 26 installed in the cabin 10 will be described. FIG. 3 is a left side view illustrating an interior of the cabin 10. FIG. 4 is a top view illustrating the interior of the cabin 10. In the present embodiment, the operating device 26 includes a left operating lever 26A, a right operating lever 26B, a left traveling pedal 26C, a right traveling pedal 26D, a left traveling lever 26E, and a right traveling lever 26F.

The operator's seat 100 is installed in the cabin 10. The operator's seat 100 includes a seat 102 on which the operator sits, and a backrest 104. The operator's seat 100 is a reclining seat, and a tilt angle of the backrest 104 is adjustable. A left armrest 106A is located on the left side of the operator's seat 100, and a right armrest 106B is located on the right side of the operator's seat 100. The left armrest 106A and the right armrest 106B are rotatably supported by the backrest 104.

A left console 120A is located on the left side of the operator's seat 100, and a right console 120B is located on the right side of the operator's seat 100. The left console 120A and the right console 120B are disposed to extend along a longitudinal direction of the operator's seat 100. The operator's seat 100 is configured to be slidable back and forth. The operator's seat 100 may be configured to be slidable back and forth along with the left console 120A and the right console 120B.

The left operating lever 26A is disposed at a front part of the left console 120A. Similarly, a right operating lever 26B is disposed at a front part of the right console 120B. The operator seated in the operator's seat 100 can operate the left operating lever 26A while gripping the left operating lever 26A with his or her left hand, and also operate the right operating lever 26B while gripping the right operating lever 26B with his or her right hand. Specifically, the operator seated in the operator's seat 100 can operate the left operating lever 26A with his or her left hand to drive the arm cylinder 8 and the turning hydraulic motor 2A. The operator seated in the operator's seat 100 can operate the right operating lever 26B with his or her right hand to drive the boom cylinder 7 and the bucket cylinder 9. Bases of the left operating lever 26A and the right operating lever 26B are each covered with a lever boot 27.

The left traveling pedal 26C and the right traveling pedal 26D are located on a floor surface in front of the operator's seat 100. The operator seated in the operator's seat 100 can operate the left traveling pedal 26C with his or her left foot to drive the left traveling hydraulic motor 1A. The operator seated in the operator's seat 100 can operate the right traveling pedal 26D with his or her right foot to drive the right traveling hydraulic motor 1B.

The left traveling lever 26E extends upward from the vicinity of the left traveling pedal 26C. The operator seated in the operator's seat 100 can operate the left traveling lever 26E while gripping the left traveling lever 26E with his or her left hand to drive the left traveling hydraulic motor 1A, in the same manner as the operation via the left traveling pedal 26C. The right traveling lever 26F extends upward from the vicinity of the right traveling pedal 26D. The operator seated in the operator's seat 100 can operate the right traveling lever 26F while gripping the right traveling lever 26F with his or her right hand to drive the right traveling hydraulic motor 1B, in the same manner as the operation via the right traveling pedal 26D.

The display device 33 is located at a right front part of the cabin 10 to display information such as working conditions or operating conditions of the shovel 150. The operator seated in the operator's seat 100 can operate the shovel 150 while checking various information displayed on the display device 33. The display device 33 is provided with the switches 34.

A gate lock lever 140 is located on the left side (i.e., the access door side) of the operator's seat 100. When the gate lock lever 140 is lifted (in the unlocked state), the hydraulic actuator becomes operable, and the operator can operate the shovel 150. When the gate lock lever 140 is depressed (in the locked state), the hydraulic actuator becomes inoperative, and the operator is unable to operate the shovel 150. Thus, unless the operator sits on the operator's seat 100 and pulls up the gate lock lever 140, the shovel 150 will not be operated, and the safety of workers, etc. who work around the shovel 150 will be maintained.

A window console 120C is installed on the right side of the right console 120B of the operator's seat 100. In FIGS. 3 and 4, the window console 120C extends over the entire length of the cabin 10 in a longitudinal direction, and is disposed parallel to the right console 120B. The display device 33 is installed at a front part of the window console 120C. The window console 120C is equipped with an ignition switch 42, a radio 43, etc. The ignition switch 42, the radio 43, etc., may be installed on the left console 120A or the right console 120B.

The left armrest 106A is located above the left console 120A. The right armrest 106B is also located above the right console 120B. Specifically, the left armrest 106A is located such that at least a portion of the left armrest 106A covers a portion of the left console 120A when viewed from above. The same applies to the right armrest 106B.

In the right console 120B, a switch panel 41 is located between the right armrest 106B and the right operating lever 26B. The switch panel 41 includes switches 41a to 41f and a dial 32. The dial 32 is provided with a switch 35.

Figure 5:
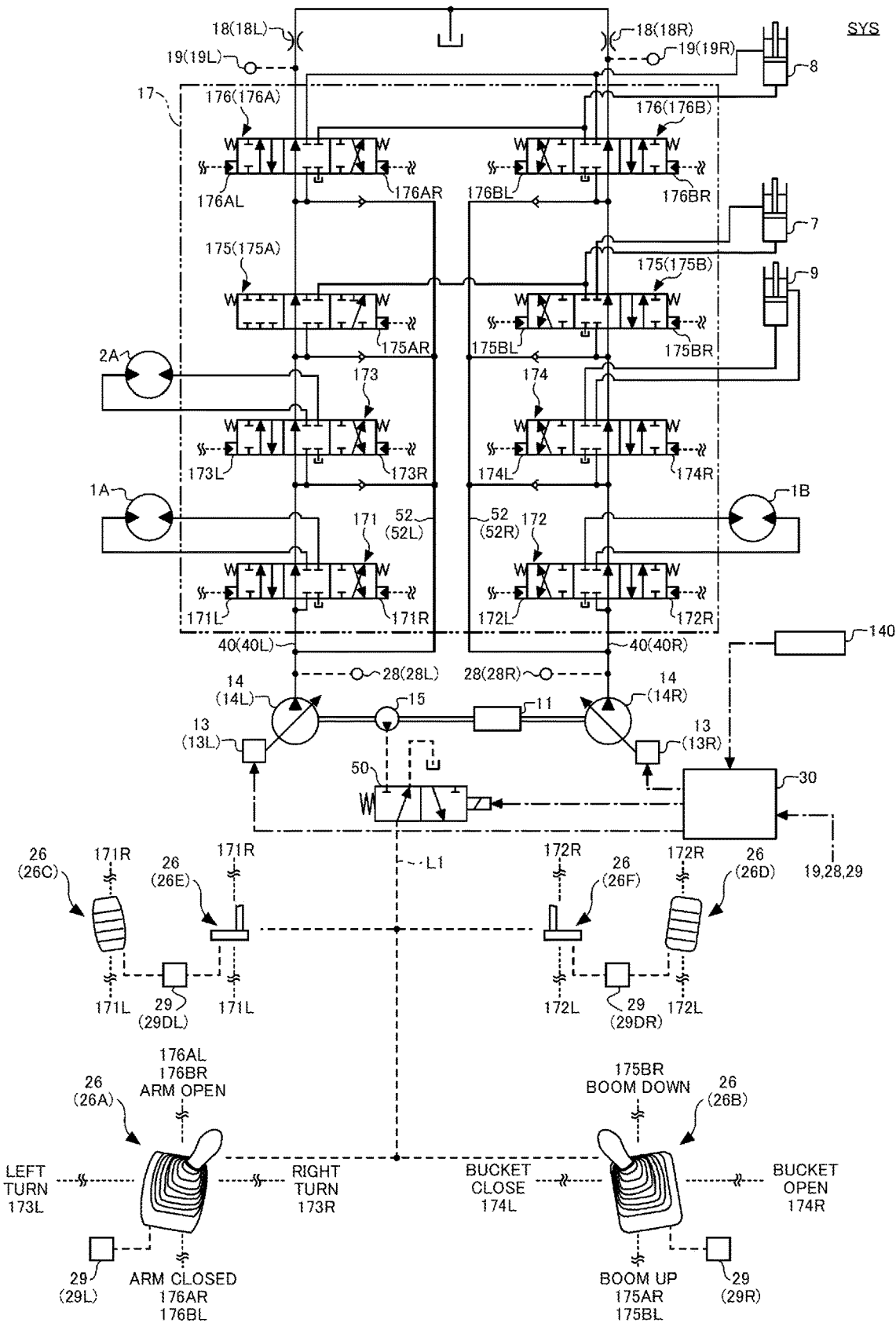
FIG. 5 is a diagram illustrating an example of a configuration of a control system installed in the shovel in FIG. 1.

Next, referring to FIG. 5, a control system SYS mounted on the shovel in FIG. 1 will be described. FIG. 5 is a schematic diagram illustrating an example of a configuration of the control system SYS, where the mechanical power transmission line, the hydraulic oil line, the pilot line, and the electrical control line are illustrated with double, solid, dashed, and dot-dash lines, respectively.

The control system SYS mainly includes an engine 11, main pumps 14, a pilot pump 15, a control valve unit 17, throttles 18, control pressure sensors 19, an operating device 26, operation pressure sensors 29, a controller 30, a gate lock valve 50, a gate lock lever 140, etc.

In the example illustrated in FIG. 5, the control valve unit 17 includes control valves 171 to 176 that control a flow of hydraulic fluid discharged by the main pumps 14. The hydraulic fluid discharged by the main pumps 14 is selectively supplied to one or more hydraulic actuators through the control valves 171 to 176. The control valves 171 to 176 are configured to control the flow rate of hydraulic fluid flowing from the main pumps 14 to the hydraulic actuators and the flow rate of hydraulic fluid flowing from the hydraulic actuators to the hydraulic fluid tank.

In FIG. 5, the control system SYS circulates hydraulic fluid from the main pumps 14 driven by the engine 11 to the hydraulic fluid tank via center bypass lines 40 or parallel lines 52, and the throttles 18.

Specifically, the center bypass lines 40 include a left center bypass line 40L and a right center bypass line 40R. The left center bypass line 40L is a hydraulic oil line through control valves 171, 173, 175A and 176A located within the control valve unit 17. The right center bypass line 40R is a hydraulic oil line through control valves 172, 174, 175B and 176B located within the control valve unit 17.

The control valve 171 is a spool valve that supplies a hydraulic fluid discharged by a left main pump 14L to the left traveling hydraulic motor 1A, and switches the flow of hydraulic fluid to discharge the hydraulic fluid discharged by the left traveling hydraulic motor 1A to the hydraulic fluid tank. When the left traveling pedal 26C or the left traveling lever 26E is tilted forward, the control valve 171 is moved to the left, in response to pilot pressure received by a right pilot port 171R, to forward rotate the left traveling hydraulic motor 1A. When the left traveling pedal 26C or the left traveling lever 26E is tilted rearward, the control valve 171 is moved to the right, in response to pilot pressure received by a left pilot port 171L, to reverse the left traveling hydraulic motor 1A.

The control valve 172 is a spool valve that supplies a hydraulic fluid discharged by a right main pump 14R to the right traveling hydraulic motor 1B, and switches the flow of hydraulic fluid to discharge the hydraulic fluid discharged by the right traveling hydraulic motor 1B to the hydraulic fluid tank. When the right traveling pedal 26D or the right traveling lever 26F is tilted forward, the control valve 172 is moved to the left, in response to pilot pressure received by a right pilot port 172R, to forward rotate the right traveling hydraulic motor 1B. When the right traveling pedal 26D or the right traveling lever 26F is tilted rearward, the control valve 172 is moved to the right, in response to pilot pressure received by the left pilot port 172L, to reverse the right traveling hydraulic motor 1B.

The control valve 173 is a spool valve that supplies a hydraulic fluid discharged by the left main pump 14L to the turning hydraulic motor 2A, and switches the flow of hydraulic fluid to discharge the hydraulic fluid discharged by the turning hydraulic motor 2A to the hydraulic fluid tank. When the left operating lever 26A is tilted to the right, the control valve 173 is moved to the left, in response to pilot pressure received by a right pilot port 173R, to forward rotate the turning hydraulic motor 2A. That is, the control valve 173 rotates the upper turning body 3 to the right. In addition, when the left operating lever 26A is tilted to the left, the control valve 173 is moved to the right, in response to pilot pressure received by a left pilot port 173L, to reverse the turning hydraulic motor 2A. That is, the control valve 173 rotates the upper turning body 3 to the left.

The control valve 174 is a spool valve that supplies a hydraulic fluid discharged by the right main pump 14R to the bucket cylinder 9 and discharges the hydraulic fluid in the bucket cylinder 9 to the hydraulic fluid tank. When the right operating lever 26B is tilted to the left, the control valve 174 is moved to the right, in response to pilot pressure received by the left pilot port 174L, and the bucket cylinder 9 is extended to close the bucket 6. When the right operating lever 26B is tilted to the right, the control valve 174 is moved to the left, in response to pilot pressure received by the right pilot port 174R, and contracts the bucket cylinder 9 to open the bucket 6.

The control valve 175 is a spool valve that supplies a hydraulic fluid discharged by the main pump 14 to the boom cylinder 7, and switches the flow of hydraulic fluid to discharge the hydraulic fluid in the boom cylinder 7 to the hydraulic fluid tank. Specifically, the control valve 175 includes the control valve 175A and the control valve 175B.

When the right operating lever 26B is tilted rearward, the control valve 175A is moved to the left, in response to pilot pressure received by the right pilot port 175AR, and the boom cylinder 7 is extended to raise the boom 4. When the right operating lever 26B is tilted forward, the control valve 175B is moved to the left, in response to pilot pressure received by the right pilot port 175BR, and the boom cylinder 7 is contracted to lower the boom 4. When the right operating lever 26B is tilted rearward, the control valve 175B is moved to the right, in response to pilot pressure received by the left pilot port 175BL, and the boom cylinder 7 is extended to raise the boom 4.

The control valve 176 is a spool valve that supplies a hydraulic fluid discharged by the main pump 14 to the arm cylinder 8, and switches the flow of hydraulic fluid to discharge the hydraulic fluid in the arm cylinder 8 to the hydraulic fluid tank. Specifically, the control valve 176 includes the control valve 176A and the control valve 176B.

When the left operating lever 26A is tilted forward, the control valve 176A is moved to the right, in response to pilot pressure received by the left pilot port 176AL, and the arm cylinder 8 is contracted to open the arm 5. Also, when the left operating lever 26A is tilted rearward, the control valve 176A is moved to the left, in response to pilot pressure received by the right pilot port 176AR, and the arm cylinder 8 is extended to close the arm 5. When the left operating lever 26A is tilted forward, the control valve 176B is moved to the left, in response to pilot pressure received by the right pilot port 176BR, and the arm cylinder 8 is contracted to open the arm 5. When the left operating lever 26A is tilted rearward, the control valve 176B is moved to the right, in response to pilot pressure received by the left pilot port 176BL, and the arm cylinder 8 is extended to close the arm 5.

In the example illustrated in FIG. 5, the operation pressure sensor 29 includes a left operation pressure sensor 29L, a right operation pressure sensor 29R, a left traveling pressure sensor 29DL, and a right traveling pressure sensor 29DR. The left operation pressure sensor 29L detects an operating content of the left operating lever 26A. The right operation pressure sensor 29R detects an operating content of the right operating lever 26B. The left traveling pressure sensor 29DL detects operating contents of the left traveling pedal 26C and the left traveling lever 26E. The right traveling pressure sensor 29DR detects operating contents of the right traveling pedal 26D and the right traveling lever 26F.

The gate lock valve 50 is configured to switch the communication and disconnection of a line connecting the operating device 26 and the pilot pump 15. In the example illustrated in FIG. 5, the gate lock valve 50 is a solenoid valve that switches the communication and disconnection of a line L1 connecting the operating device 26 and the pilot pump 15. The gate lock valve 50 causes the line L1 to be in communication when an unlock signal is received, and disconnects the line L1 when the unlock signal is not received. The gate lock valve 50 may be configured to disconnect the line L1 when a lock signal is received. The gate lock valve 50 may consist of a proportional pressure reducing valve.

Next, negative control adopted in the hydraulic system illustrated in FIG. 5 is described. In the center bypass line 40, a throttle 18 is located between the most downstream control valve 176 and the hydraulic oil tank. The flow of hydraulic fluid through the control valve 176 to the hydraulic fluid tank is limited by the throttle 18. The throttle 18 then generates control pressure for controlling the regulator 13, that is, control pressure for controlling a discharge amount of the main pump 14. The flow rate of the hydraulic fluid passing through the throttle 18 is called the "bleed flow rate". The control pressure sensor 19 is a sensor for detecting the control pressure, and outputs a detected value to the controller 30.

In the example illustrated in FIG. 5, the throttle 18 is a fixed throttle whose opening area does not change. The throttle 18 includes a left throttle 18L located between the control valve 176A and the hydraulic oil tank in the left center bypass line 40L, and a right throttle 18R located between the control valve 176B and the hydraulic oil tank in the right center bypass line 40R. The control pressure sensor 19 includes a left control pressure sensor 19L for detecting the control pressure generated by the left throttle 18L, and a right control pressure sensor 19R for detecting the control pressure generated by the right throttle 18R.

The controller 30 controls a discharge amount of the main pump 14 by adjusting a swashplate tilt angle of the main pump 14 according to the control pressure. Hereafter, a relationship between the control pressure and the discharge amount of the main pump 14 is referred to as a "negative control characteristic". The control of the discharge amount based on the negative control characteristic may, for example, be provided by using a reference table stored in a ROM or the like, or may be provided by using a predetermined calculation formula. The controller 30 refers, for example, to a reference table representing a predetermined negative control characteristic, and controls the discharge amount of the main pump 14 such that the larger the control pressure, the lower the discharge amount of the main pump 14, and the smaller the control pressure, the higher the discharge amount of the main pump 14.

Specifically, as illustrated in FIG. 5, when none of the operating devices 26 are operated and none of the hydraulic actuators are operated, that is, when the hydraulic system is in a standby mode, the hydraulic fluid discharged by the left main pump 14L passes through the control valve 176A to the left throttle 18L. Then, when the flow rate of the hydraulic fluid reaching the left throttle 18L is a predetermined flow rate or more, the control pressure generated upstream of the left throttle 18L reaches a predetermined pressure. When the control pressure reaches the predetermined pressure, the controller 30 reduces the discharge amount of the left main pump 14L to a predetermined minimum allowable discharge amount. This can prevent the pressure loss (pumping loss) when the discharged hydraulic fluid passes through the left center bypass line 40L. This predetermined minimum allowable discharge amount in the standby mode is referred to as a "standby flow rate". The controller 30 similarly controls the discharge amount of the right main pump 14R.

On the other hand, when any of the hydraulic actuators of the left traveling hydraulic motor 1A, the turning hydraulic motor 2A, the boom cylinder 7, and the arm cylinder 8 is operated, the hydraulic fluid discharged by the left main pump 14L flows into the operated hydraulic actuator through the control valve corresponding to the operated hydraulic actuator. Therefore, the flow rate of the hydraulic fluid passing through the control valve 176A to the left throttle 18L decreases, and the control pressure generated upstream of the left throttle 18L decreases. As a result, the controller 30 increases the discharge amount of the left main pump 14L, supplies sufficient hydraulic fluid to the operated hydraulic actuator, and ensures the operation of the operated hydraulic actuator. The controller 30 similarly controls the discharge amount of the right main pump 14R. The flow rate of hydraulic fluid flowing into the hydraulic actuator is referred to as an "actuator flow rate". In this case, the flow rate of hydraulic fluid discharged by the left main pump 14L corresponds to the sum of the actuator flow rate for the left center bypass line 40L and the bleed flow rate for the left center bypass line 40L. The same applies to the flow rate of hydraulic fluid discharged by the right main pump 14R.

With the configuration described above, the hydraulic system illustrated in FIG. 5 can reliably supply necessary and sufficient hydraulic fluid from the main pump 14 to the hydraulic actuator to be operated when the hydraulic actuator is operated. Also, in the standby mode, the hydraulic system illustrated in FIG. 5 can reduce wasteful consumption of hydraulic energy. This is because the bleed flow rate can be reduced to the standby flow rate.

Figure 6:
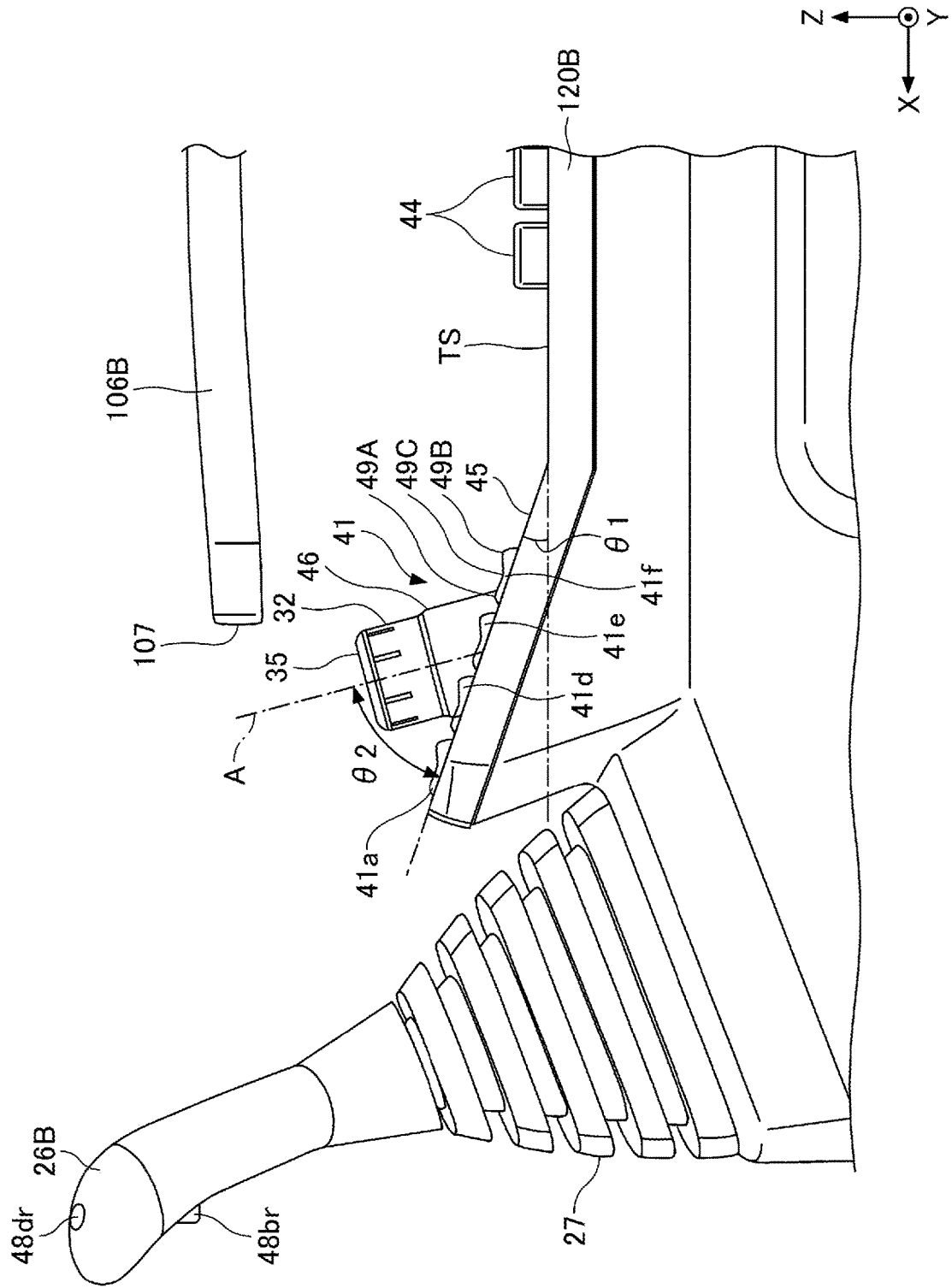
FIG. 6 is a side view illustrating a switch panel and its vicinity.
Figure 7:
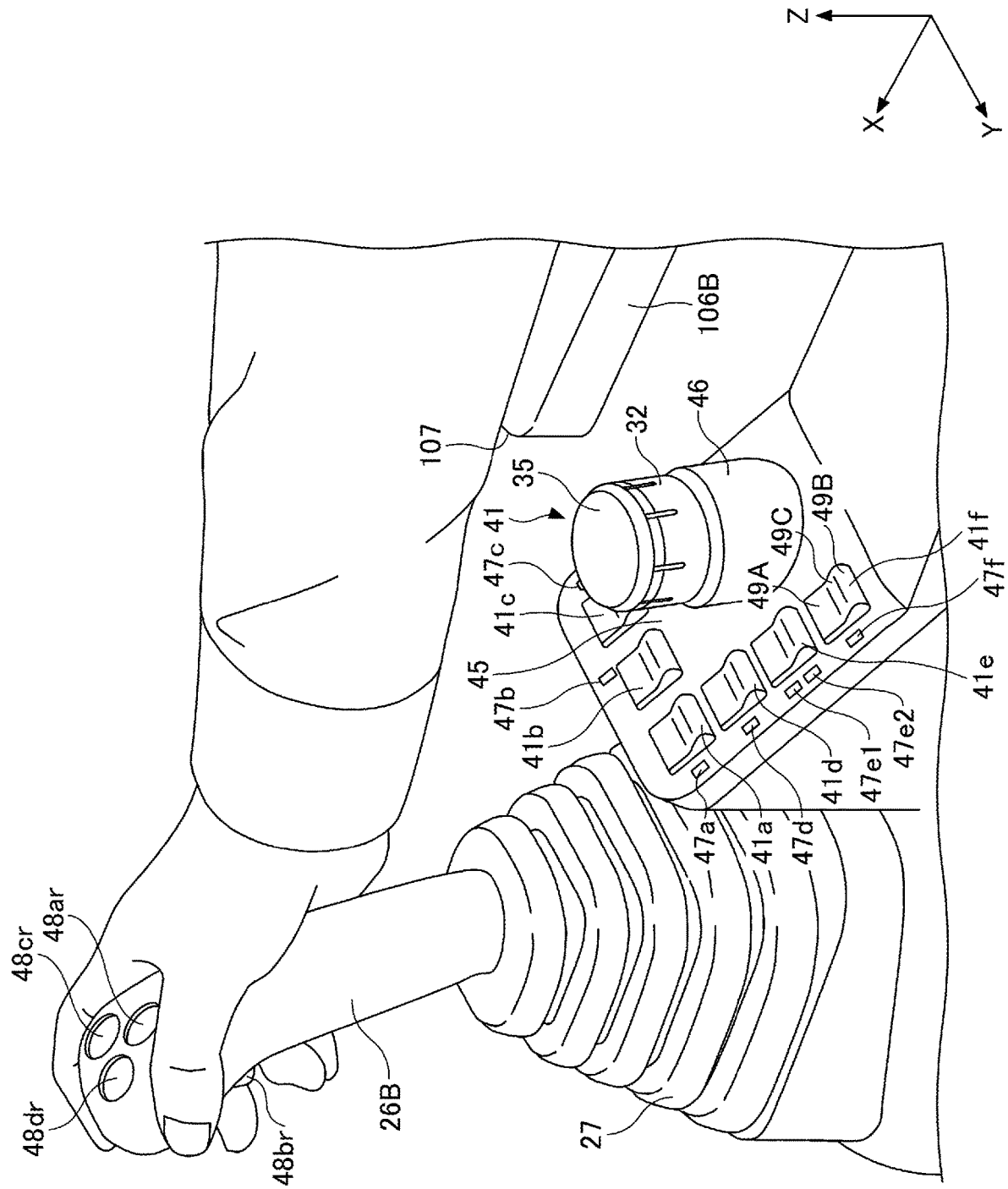
FIG. 7 is a perspective view illustrating the switch panel and its vicinity.

Next, referring to FIGS. 6 and 7, details of the switch panel 41 will be described. FIG. 6 is a side view illustrating the switch panel 41 and its vicinity. FIG. 7 is a perspective view illustrating the switch panel 41 and its vicinity.

As illustrated in FIG. 4, the switch panel 41 is disposed on an upper surface of the right console 120B, and is positioned ahead of the right armrest 106B and behind the right operating lever 26B.

In the examples illustrated in FIG. 6 and FIG. 7, the right armrest 106B is configured to slide back and forth along with the operator's seat 100. The right console 120B, on the other hand, is configured not to slide back and forth. Thus, the length of the right armrest 106B in a longitudinal direction is set such that the front end 107 of the right armrest 106B does not cover the switch panel 41 from above, even when the right armrest 106B slides furthest forward. However, since the right armrest 106B may be configured not to cover at least the switches 41a to 41f and the dial 32 from above, the right armrest 106B may cover a part of the switch panel 41 from above.

The switches 41a to 41f arranged on the switch panel 41 are assigned functions that are frequently used while the shovel 150 is in operation. For example, the switches 41a to 41f include a traveling changeover switch for switching setting statuses, a spare circuit changeover (attachment changeover) switch, and a crane mode changeover switch, in addition to a windshield wiper switch, a light switch, and a windshield washer switch as ON/OFF switches for accessories.

In this manner, the switch panel 41 can aggregate, on the right console 120B, the switches 41a to 41f that are frequently used while the shovel 150 is in operation. The operator can operate the switch panel 41 while keeping his or her arm on the right armrest 106B by releasing his or her hand from the right operating lever 26B and then gripping the right operating lever 26B while placing his or her arm on the right armrest 106B. Thus, the operator can operate the switch panel 41 with little change in the posture of his or her upper body. Accordingly, this configuration can improve the operability of the switch panel 41.

The switch panel 41 is arranged such that an upper surface 45 is inclined with respect to an upper surface TS of the right console 120B. Specifically, the switch panel 41 is arranged such that the front end of the upper surface 45 is higher than the rear end of the upper surface 45. The tilt angle θ1 of the upper surface 45 with respect to the upper surface TS is, for example, approximately 10 to 40 degrees. This arrangement can improve the viewability of the upper surface 45 of the switch panel 41 by the operator, which in turn improves the operability of the switch panel 41. The upper surface 45 of the switch panel 41 may be inclined toward the operator's seat.

The dial 32 is approximately cylindrical, and its central axis is the rotary axis A. The dial 32 is rotatable about the rotary axis A. The operator can adjust the target speed of the engine 11 by rotating the dial 32.

The switch 35 is disposed on the upper end surface of the dial 32. The operator can switch the output characteristics of the shovel 150 by depressing the switch 35 in the direction of the rotary axis A.

The dial 32 is arranged such that the rotary axis A is inclined with respect to the upper surface TS of the right console 120B. Specifically, the dial 32 is arranged such that the rotary axis A is inclined forward, that is, the front end of the upper surface is lower than the rear end of the upper surface. More specifically, the dial 32 is positioned on an approximately cylindrical base 46. The dial 32 is arranged such that its upper end face is positioned higher than the front end of the upper surface 45 of the switch panel 41. The tilt angle θ2 of the rotary axis A of the dial 32 with respect to the upper surface 45 of the switch panel 41 is, for example, approximately 20 to 50 degrees.

This arrangement allows the operator to rotate the dial 32 by pinching the dial 32 with his or her fingers, even while keeping his or her arm on the right armrest 106B. Thus, this arrangement can improve the operability of the dial 32.

In the present embodiment, the switches 41a to 41f of the switch panel 41 are assigned functions that are frequently used during operation. On the other hand, the switches 34 arranged on the display device 33 (See FIG. 4) are respectively assigned functions that are not frequently used during operation. Specifically, the functions assigned to the switches 34 may, for example, be a temperature adjustment function of an air conditioner, an air flow adjustment function of an air conditioner, and a function to switch between an hour meter and a trip meter, respectively.

The rocker switches 44 are located below the right armrest 106B on the right console 120B. In the example illustrated in FIG. 6, the rocker switches 44 are assigned a function that is utilized when a special end attachment such as a grappling tool or lifting magnet is attached to the shovel 150. Also, the rocker switches 44 may be assigned a function to switch the traveling alarm on or off or a function to switch an obstacle detection system on or off.

In the present embodiment, respective signals from the dial 32, the switches 41a to 41f, and the rocker switches 44 are transmitted to the controller 30. The controller 30 then performs various operations based on those signals. However, respective signals from the dial 32 and the switches 41a to 41f may be transmitted to a microcomputer disposed in the switch panel 41. In this case, the microcomputer disposed in the switch panel 41 may be configured to perform various operations based on these signals, and transmit the operation results to the controller 30. The microcomputer disposed in the switch panel 41 and the controller 30 may be connected via a CAN.

The switches 41a to 41f of the switch panel 41 are located around the dial 32. The switches 41a to 41f are preferably located such that the switches 41a to 41f are not hidden behind the dial 32 as viewed by the operator seated in the operator's seat 100.

In the example illustrated in FIG. 7, the switches 41a to 41f are located on the left side and front side of the dial 32. Thus, the operator seated in the operator's seat 100 can readily see each of the switches 41a to 41f. Thus, such an arrangement can improve the operability of the switches 41a to 41f.

In the example illustrated in FIG. 7, the switch 41a is assigned a function to switch a traveling speed, the switch 41b is assigned a function to switch the hydraulic circuit on and off of a special end attachment, and the switch 41c is assigned a function to switch a crane mode on and off. Also, the switch 41d is assigned a function to switch a work light on and off, the switch 41e is assigned a function to switch the windshield wiper on and off, and the switch 41f is assigned a function to eject windshield washer fluid.

The switches 41a to 41f may be configured to include alternate-operation push-button switches or momentary-operation push-button switches.

The switches 41a to 41f are preferably configured to remain protruding from the upper surface 45 of the switch panel 41 even when they are operated. This is to prevent dust or the like from accumulating in the areas where the switches 41a to 41f are located.

Alternatively, respective surfaces of the switches 41a to 41f may be integrally formed with the upper surface 45 of the switch panel 41. For example, each of the switches 41a to 41f may consist of a membrane switch. Since this configuration can eliminate a gap between each of the switches 41a to 41f and the upper surface 45, dust can be prevented from entering the switch panel 41 through the gap, and the stability of the operation of the switch panel 41 can be improved. Preferably, the switches 41a to 41f and the upper surface 45 are made of a material (e.g., silicon) that produces an elastic force when they are pressed. This is to improve the operating feeling of the switches. Also, the surfaces of the switches 41a to 41f may be frosted. This is to prevent the adhesion of dust, etc.

As illustrated in FIG. 6 and FIG. 7, each of the switches 41a to 41f is configured to include a front portion 49A on the front side of the vehicle and a rear portion 49B on the rear side of the vehicle such that the rear portion 49B protrudes from the front portion 49A with respect to the upper surface 45 of the switch panel 41. A smooth curved portion 49C is formed between the front portion 49A and the rear portion 49B of each switch. The curved portion 49C is configured to be in contact with a ball surface of a finger when the operator places his or her finger on the switch to direct his or her fingertip forward. Thus, this configuration can improve the fingering performance of switches 41a to 41f and, in turn, the operability of switches 41a to 41f.

The switches 41a to 41f of the switch panel 41 may have illustrations on them that represent the functions assigned to respective switches, and the illustrations may be configured to glow when each switch is on.

In the examples illustrated in FIG. 6 and FIG. 7, on the upper surface 45 of the switch panel 41, indicators 47a to 47f corresponding to the switches 41a to 41f are respectively disposed near the switches 41a to 41f. The indicators 47a to 47f are configured to switch between on and off states according to the operation of the corresponding switch. For example, the indicator 47a is configured to be lit when the associated switch 41a is in the on state, allowing the operator to visually recognize that the switch 41a is in the on state. For example, when the switch 41d to which a function to switch the working light on and off is assigned is in the on state, the indicator 47d corresponding to the switch 41d is lit, and when the switch 41d is in the off state, the indicator 47d is off. The lighting color of the indicators 47a to 47f is orange but may be another color such as blue, red, or yellow. The visual effect of such indicators 47a to 47f is particularly effective when the switches 41a to 41f are adopted to switch between the on and off states every time the switches are depressed, but there is no difference in physical appearance of the switches between the on and off states.

Note that the letter "a" to "f" at the end of the sign of each indicator is the same as the letter at the end of the sign of a corresponding switch. In addition, the number of indicators associated with each switch may be two or more. In the example illustrated in FIG. 7, the switch 41e includes two indicators 47e1 and 47e2 associated with the switch 41e. The switch 41e is a windshield wiper switch and is configured such that the operating speed of the windshield wiper is switched between multiple stages according to the number of times the switch 41e is depressed. When the windshield wiper is operated at a low speed, only the indicator 47e1 is lit, and when the windshield wiper is operated at a high speed, both the indicators 47e1 and 47e2 are lit. Thus, the number of indicators or lighting pattern may be desirably set according to the function of the corresponding switch. This enables each of the indicators to more effectively communicate a state of the corresponding switch to the operator.

In addition, the controller 30 may be configured to execute different functions in response to different manners in which the switches 41a to 41f are operated. For example, the controller 30 may lock the turning motion of the shovel 150 when the switches 41a and 41d are long-pressed simultaneously. Alternatively, the controller 30 may cause the display device 33 to display information relating to the special end attachment when the switch 41b is long-pressed.

Even after the engine of the shovel 150 has stopped, the on state of the switches 41a to 41f may be maintained for a predetermined time. For example, when the switch 41d to which the function to switch the working light on and off is assigned is in the on state, and the engine 11 is stopped when the working light of the shovel 150 is on, the on state of the switch 41d may be maintained for a predetermined time. With this configuration, the shovel 150 can keep the working light on for a predetermined time even after the engine 11 has stopped. In this case, the working light is not immediately turned off after the engine has stopped, and remains on for a predetermined time. Thus, the shovel 150 can ensure the viewability of the surroundings when the operator exits the cabin 10, thereby improving safety.

In the present embodiment, as illustrated in FIG. 7, a lower switch 48ar, a right switch 48cr, and a left switch 48dr are disposed on the surface of the upper end of the right operating lever 26B on the rear side of the vehicle. The lower switch 48ar is positioned below the right switch 48cr and the left switch 48dr. The right switch 48cr and the left switch 48dr are arranged to be at the same height. The right switch 48cr is located on the right side as viewed from the operator's seat 100, and the left switch 48dr is located on the left side as viewed from the operator's seat 100. A trigger switch 48br is located on a front surface of the right operating lever 26B facing the front side of the vehicle.

The lower switch 48ar, the right switch 48cr, and the left switch 48dr are located such that the operator can operate these switches with his or her right-hand thumb while gripping the right operating lever 26B with his or her right hand. The trigger switch 48br is located such that the operator can operate the switch with his or her right-hand index or middle finger while gripping the right operating lever 26B with his or her right hand.

The lower switch 48ar, the trigger switch 48br, the right switch 48cr, and the left switch 48dr (Hereafter collectively referred to as a "right lever switch") are switches that typically switch between the on and off states every time the switches are depressed, but do not differ in physical appearance between the on and off states. However, each of the right lever switches may be a switch that differs in physical appearance between the on and off states (e.g., a switch that is kept pressed in).

Also, each of the right lever switches is typically formed integrally with the surface of the right operating lever 26B. For example, each of the right lever switches may consist of a membrane switch. Since this configuration eliminates the gap between each of the right lever switches and the surface of the right operating lever 26B, dust and the like can be prevented from entering the right operating lever 26B through the gap. That is, this configuration can improve the dust resistance of the right operating lever 26B.

As in the right operating lever 26B, the left operating lever 26A may be provided with a lower switch 48al, a trigger switch 48bl, a right switch 48cl, and a left switch 48dl (Hereafter collectively referred to as a "left lever switch") (see FIG. 4). The respective arrangements of the left lever switches are similar to the respective arrangements of the right lever switches described with reference to FIG. 7. In the following, the right lever switch and the left lever switch may be collectively referred to as a lever switch.

In the example illustrated in FIG. 7, the lower switch 48*ar* of the right operating lever 26B is assigned a one-touch idle function (a function to switch the engine 11 of the shovel 150 to idle operation), and the trigger switch 48*br* is assigned to a window washing function (a function to eject windshield washer fluid and activate the windshield wiper). The right switch 48*cr* is assigned to a hands-free calling function (which enables calls using a wirelessly connected smartphone), and the left switch 48*dr* is assigned a function to turn the air conditioner on or off.

A horn function is assigned to a lower switch 48*al* of the left operating lever 26A, and a mute function such as a radio 43 is assigned to a trigger switch 48*bl*. A function to switch the alarm sound on and off is assigned to the right switch 48*cl* (e.g., the alarm sound output when an obstacle is detected), and a function to switch the camera image displayed on the display device 33 is assigned to the left switch 48*dl*. The function assigned to the right switch 48*cl* may be the switches 41*a* to 41*f* of the switch panel 41 or the rocker switches 44.

Thus, the switches 41*a* to 41*f* of the switch panel 41 may have functions different from those of the left and right lever switches. Also, the functions of each of the left lever switch and the right lever switch may be changed, for example, by operation through the display device 33.

With the above configuration, the operator of the shovel 150 can operate the switches 41*a* to 41*f* disposed near the right operating lever 26B. And, the switches 41*a* to 41*f* are assigned functions that are frequently used while the shovel 150 is in operation. Thus, the operator can perform frequently used functions while operating the shovel 150 by simply depressing the switches 41*a* to 41*f* with his or her right hand gripping the right operating lever without changing the posture of his or her upper body.

On the other hand, since the switches 41*a* to 41*f* are disposed near the right operating lever 26B, the operator of the shovel 150 may accidentally touch the switches 41*a* to 41*f*. For example, the operator may bring part of his or her arm into contact with the switch 35 when he or she tilts the right operating lever 26B forward to lower the boom 4. In this case, the controller 30 changes the output characteristics of the shovel 150 in response to the depressing of the switch 35.

To prevent such an incidence, in the present embodiment, the controller 30 is configured not to execute the function assigned to the switch when the operating device 26 is operated, even in a case of the switch being operated.

For example, the controller 30 is configured not to execute the function assigned to the operated switch when the right operating lever 26B is operated, even in a case of any of the switches 41*a* to 41*f* and the switches 35 arranged in the switch panel 41 being operated.

Specifically, the controller 30 determines whether or not the operating device 26 is operated based on the output of the operating content detection device. More specifically, the controller 30 determines whether or not at least one of the left operating lever 26A or the right operating lever 26B is operated based on the output of the operation pressure sensor 29 at every predetermined control period.

When the controller determines that the operating device 26 is operated, the controller 30 is configured not to execute functions according to signals from the switches 41*a* to 41*f* and the switch 35. Specifically, the controller 30 changes the value of a first flag stored in a predetermined area of the RAM from "0" to "1" when the controller determines that the operating device 26 is operated. The first flag is a variable representing a state of the operating device 26. The value of 0 for the first flag indicates that the operating device 26 is not operated, and the value of 1 for the first flag indicates that the operating device 26 is operated.

The controller 30 may change the value of the first flag from "0" to "1" when the controller determines that at least one of the left operating lever 26A, the right operating lever 26B, the left traveling pedal 26C, the right traveling pedal 26D, the left traveling lever 26E, and the right traveling lever 26F is operated. Alternatively, the controller 30 may change the value of the first flag from "0" to "1" when the controller 30 determines that only the right operating lever 26B is operated. That is, the controller 30 may be configured not to change the value of the first flag from "0" to "1" even when the operating levers other than the right operating lever are operated. This is because there is no switch placed near the operating devices other than the right operating lever that can be mis-operated.

In addition, when the controller 30 determines that the operating device 26 is operated, the controller 30 may be configured not to change the value of the first flag from "1" to "0" until a predetermined time (e.g., 1 second) has elapsed from the time of the determination. This is so as to, for example, prevent the output characteristics of the shovel 150 from being erroneously changed according to a signal from the switch 35 received when the right operating lever 26B momentarily returns to the neutral position. This is because the signal from the switch 35 in this case may be generated, for example, by the operator's arm accidentally touching the switch 35.

Then, when the controller 30 receives a signal from at least one of the switches 41*a* to 41*f* and the switch 35, the controller 30 refers to the value of the first flag. Then, when the value of the first flag is "0", the controller 30 determines that the operating device 26 is not operated and executes the function corresponding to the signal. On the other hand, when the value of the first flag is "1", the controller 30 determines that the operating device 26 is operated and does not execute the function corresponding to the signal.

Figure 8:
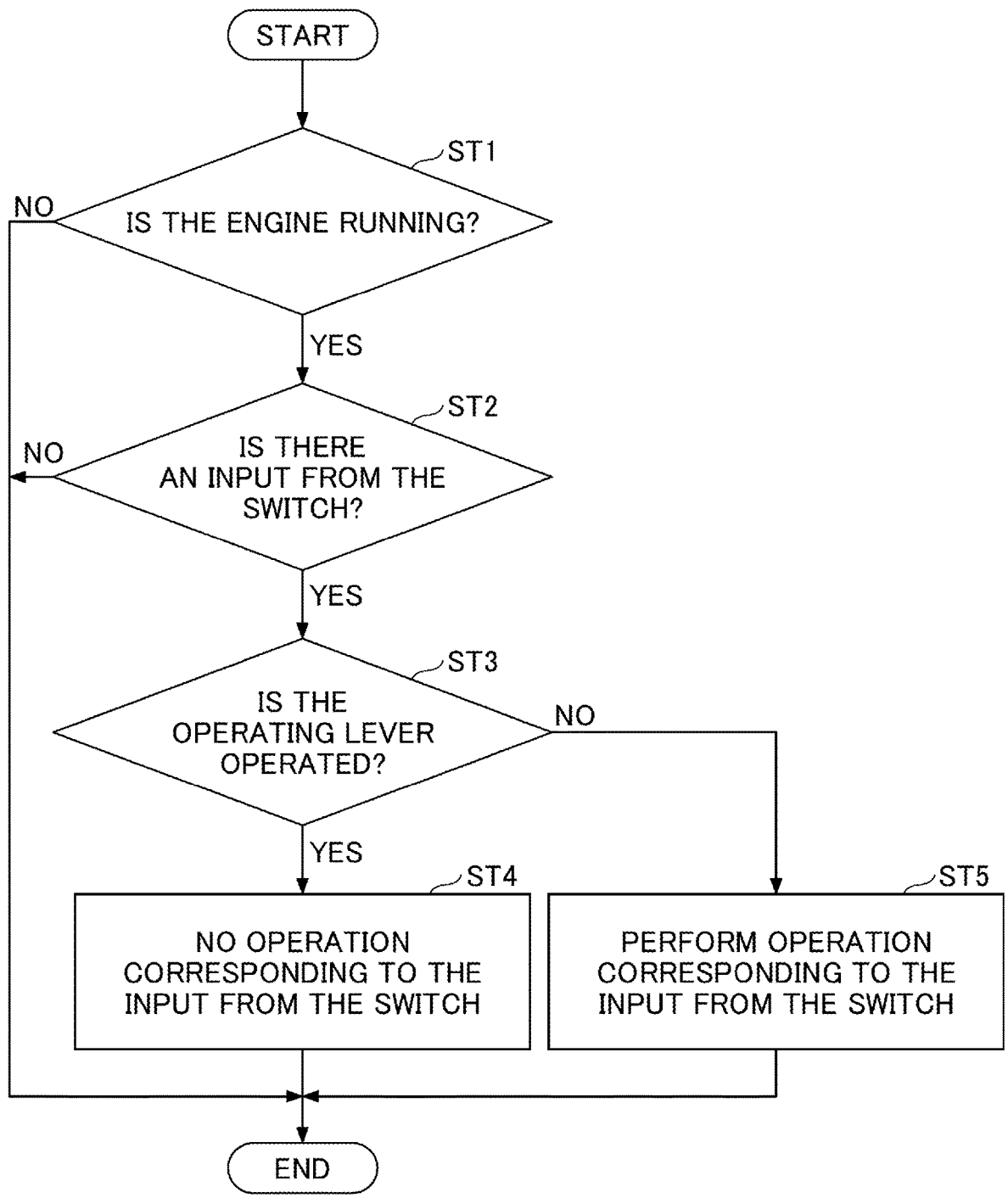
FIG. 8 is a flowchart illustrating one example of determination processing.

Next, referring to FIG. 8, an example of a process of determination (Hereafter, referred to as a "determination process") in which the controller 30 determines whether or not to execute a function assigned to a switch when receiving a signal from that switch will be described. FIG. 8 is a flowchart illustrating an example of the determination process. The controller 30 repeatedly executes this determination process at every predetermined control period.

First, the controller 30 determines whether or not the engine 11 is running (step ST1). In the example illustrated in FIG. 8, the controller 30 determines whether the engine 11 is running based on an output from the ignition switch 42. This is to determine whether or not the hydraulic actuator is in a movable state. Specifically, when the controller 30 determines that the engine 11 is running, the controller 30 can determine that the operator is able to move the hydraulic actuator. In addition, when the controller 30 determines that the engine 11 is not running, the controller 30 can determine that the operator is unable to move the hydraulic actuator.

Instead of determining whether or not the engine 11 is running, the controller 30 may determine whether or not the line L1 is blocked by the gate lock valve 50. This is because the controller 30 can determine that the hydraulic actuator can be moved when the controller 30 can determine that the line L1 is not blocked by the gate lock valve 50.

When the controller 30 determines that the engine 11 is not running (NO in step ST1), the controller 30 ends the present determination process.

When the controller 30 determines the engine 11 is running (YES in step ST1), the controller 30 determines whether or not there is an input from the switch (step ST2). In the example illustrated in FIG. 8, the controller 30 determines whether or not the switch 35 has been depressed. The controller 30 may determine whether or not any of the switches 41a to 41f has been depressed.

When the controller 30 determines that there is no input from the switch (NO in step ST2), the controller 30 ends the present determination process.

When the controller 30 determines that there is an input from the switch (YES in step ST2), the controller 30 determines whether or not the operating lever is operated (step ST3). In the example illustrated in FIG. 8, the controller 30 determines whether or not at least one of the left operating lever 26A or the right operating lever 26B is operated based on the output of the operation pressure sensor 29.

Specifically, the controller 30 determines whether or not the operating lever is operated based on the pilot pressure acting on the pilot port in each of the control valves 173 to 176, i.e., the pilot pressure generated by the operating lever. When the operating lever is an electric operating device, the controller 30 can determine whether or not the operating lever is operated based on an electric signal corresponding to an operating amount of the operating lever.

More specifically, the controller 30 determines that the operating lever is operated when the controller 30 determines that at least one of the left operating lever 26A or the right operating lever 26B is operated by a predetermined operating amount or more. The controller 30 may determine that the operating lever is operated when the controller 30 determines that at least one of the left operating lever 26A, the right operating lever 26B, the left traveling pedal 26C, the right traveling pedal 26D, the left traveling lever 26E, and the right traveling lever 26F is operated by the predetermined operating amount or more. Alternatively, when the switch that is likely to be mis-operated is located only near the right operating lever 26B, the controller 30 may determine that the operating lever is operated only when the controller 30 determines that the right operating lever 26B is operated by the predetermined operating amount or more. That is, the controller 30 may be configured not to determine that the operating lever is operated when any of the operating levers other than the right operating lever 26B is operated.

Alternatively, when the controller 30 utilizes a first flag, which is a variable representing a state of the operating device 26, the controller 30 may determine whether or not the operating lever is operated based on the value of the first flag. In this case, the controller 30 determines that the operating lever is operated when the value of the first flag is 1, and determines that the operating lever is not operated when the value of the first flag is 0.

Then, when the controller 30 determines that the operating lever is operated (YES in step ST3), the controller 30 does not perform the operation corresponding to the input from the switch (step ST4). In the example illustrated in FIG. 8, the controller 30 ignores the input from the switch 35 without performing the operation corresponding to the input from the switch 35, i.e., a function assigned to the switch 35 in response to the input from the switch 35.

On the other hand, when the controller 30 determines that the operating lever is not operated (NO in step ST3), the controller 30 performs an operation corresponding to the input from the switch (step ST5). In the example illustrated in FIG. 8, the controller 30 performs the operation corresponding to the input from the switch 35, that is, the function assigned to the switch 35 in response to the input from the switch 35.

This determination process enables the controller 30 to prevent the function assigned to the switch 35 from being executed when, for example, the operator's arm accidentally touches the switch 35 while the operator is operating the right operating lever 26B. Specifically, the controller 30 can prevent the output characteristics of the shovel 150 from being accidentally changed when the operator's arm accidentally touches the switch 35 while the operator operates the right operating lever 26B to lower the boom 4.

Since this reliably prevents the function assigned to the switch 35 from being accidentally executed, the switch 35 may be installed at a position at which the operator's arm can reach when the operator is operating the right operating lever 26B. That is, the shovel 150 configured to perform a determination process can reduce the distance between the right operating lever 26B and the switch 35 while preventing the function assigned to the switch 35 from being executed by mistake, thereby improving the operability of the switch 35. The operator can operate the switch 35 in almost the same posture as when operating the right operating lever 26B. The same applies to switches 41a to 41f.

Note that when the controller 30 determines that the operating lever is operated, the controller 30 may maintain such a determination result for a predetermined time (e.g., 1 second). Specifically, even when the controller 30 can determine that "the operating lever is not operated" based on the output of the operation pressure sensor 29 or the electrical signal corresponding to the operating amount of the operating lever, the controller 30 may maintain a determination result representing that "the operating lever is operated" until a predetermined time has elapsed after the determination representing that "the operating lever is operated" is made. In other words, when a predetermined time has elapsed since the controller 30 has made the last determination representing that "the operating lever is operated", the controller 30 can determine that "the operating lever is not operated" based on the output of the operation pressure sensor 29 or the electrical signal corresponding to the operating amount of the operating lever. This is to prevent the function assigned to the switch from being executed in response to the signal from the switch being received when the operating lever momentarily returns to the neutral position.

As described above, the shovel 150 according to the embodiment of the present invention includes a lower traveling body 1, an upper turning body 3 turnably mounted on the lower traveling body 1, a cabin 10 as a cab mounted on the upper turning body 3, an operator's seat 100 installed in the cabin 10, an operating lever installed in the cabin 10, and a switch installed in the cabin 10. The switch is configured to be disabled when the operating lever is operated. In the example illustrated in FIG. 7, the switch 35 is configured to be disabled when at least one of the left operating lever 26A or the right operating lever 26B is operated. A state in which the switch 35 is disabled means, for example, that a function assigned to the switch 35 is not executed even when the switch 35 is depressed. The dial 32, which is another example of the switch, may also be configured to be disabled when at least one of the left operating lever 26A or the right operating lever 26B is operated. A state in which the dial 32 is disabled means, for example, that a target speed of the engine 11 does not change even though the dial 32 is rotated.

In this manner, the enabled and disabled states of the switch 35 or the like can be switched according to the state of the operating device 26.

In addition, a configuration in which the switch is disabled when the operating lever is operated may be provided as a function capable of switching on and off (a mis-operation preventing function). The on and off switching acting as the mis-operation preventing function may be executed through, for example, a setting screen displayed on the display device 33. In this configuration, when the mis-operation preventing function is off, the switch is not disabled even while the operating lever is operated, and when that switch is operated, the function assigned to the switch is executed. On the other hand, when the mis-operation preventing function is on, the switch is disabled while the operating lever is operated, and even when that switch is operated, the function assigned to the switch will not be executed. The on and off setting of the mis-operation preventing function may be configured to be selectable for each switch.

In addition, the mis-operation preventing function may be configured not to be on when one of the operating devices 26 (e.g., the left operating lever 26A) is operated, but the mis-operation preventing function may be configured to be on when another one of the operating devices 26 (the right operating lever 26B) is operated, or the mis-operation preventing function may be set as such, through the setting screen.

Also, as described above, the dial 32 has neither a scale nor a mark to identify the present level. Thus, when the dial 32 is disabled, the operator who sees the dial 32 will not be confused even when the arm or clothing of the operator touches the dial 32 to unintentionally rotate the dial 32. This is because a situation does not arise in which the level represented by a scale or mark is the first level even when the actual level is the 10th level. That is, when the operator sees the dial 32, he or she does not get information that can identify the present level.

The switch that is disabled when at least one of the left operating lever 26A or the right operating lever 26B is operated may include, for example, all of the switches 41a to 41f illustrated in FIG. 7. Alternatively, the switch that is disabled when at least one of the left operating lever 26A or the right operating lever 26B is operated may include some of the switches 41a to 41f. That is, the shovel 150 may include a switch that is not disabled even when at least one of the left operating lever 26A or the right operating lever 26B is operated. In other words, the shovel 150 may include a switch, which is not disabled regardless of whether or not the operating lever is being operated. An emergency stop switch is an example of the switch that is not disabled. The lever switch is another example of the switch that is not disabled. In addition, the switch that is not disabled may be a switch such as a rocker switch 44 (e.g., the switches 34, etc. arranged on a display device 33) other than the switches 41a to 41f located on the switch panel 41. This is because such a switch is located at a position difficult to make contact with the operator's arm. Alternatively, the shovel 150 may be configured such that when at least one of the left operating lever 26A or the right operating lever 26B is operated, only at least one of the dial 32 or the switch 35 with which the operator's arm is most likely to make contact is disabled and other operating parts such as other switches remain enabled.

This configuration results in a close positioning of the switch 35 and the right operating lever 26B. That is, the switch 35 is located within a range (Hereafter referred to as a "reachable range AZ") in which the operator's arm can reach when the operator is operating the right operating lever 26B. In other words, the switch 35 need not be located outside the reachable range AZ. This is to ensure that the function assigned to the switch 35 is prevented from being executed unintentionally, even when the operator's arm accidentally touches the switch 35. As a result, this configuration can improve the operability of the switch 35. In the configuration where the switch 35 is located outside the reachable range AZ, the operator who gripped the right operating lever 26B with his or her right hand is required to move his or her right arm significantly to operate the switch 35. In contrast, in the configuration where the switch 35 is located within the reachable range AZ, the operator can operate the switch 35 with little movement of his or her right arm. The same applies to the switches 41a to 41f.

Figure 9:
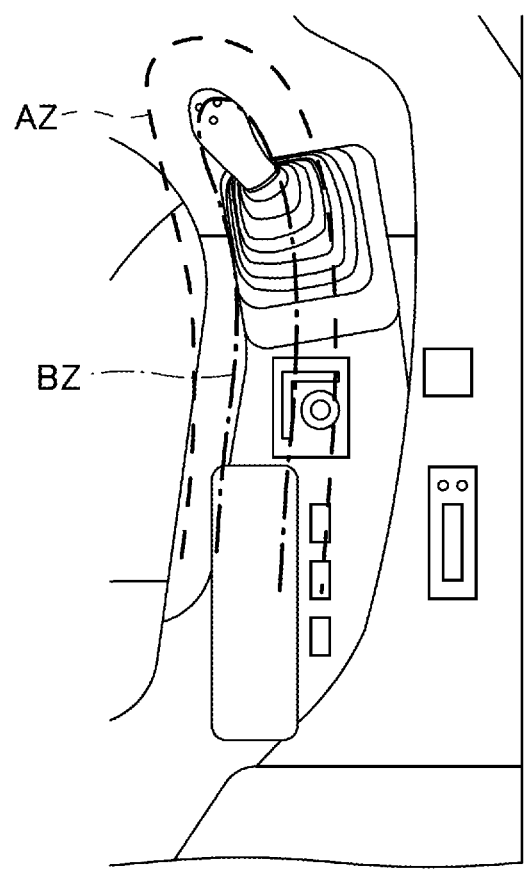
FIG. 9 is a top view illustrating the switch panel and its vicinity.
Figure 10:
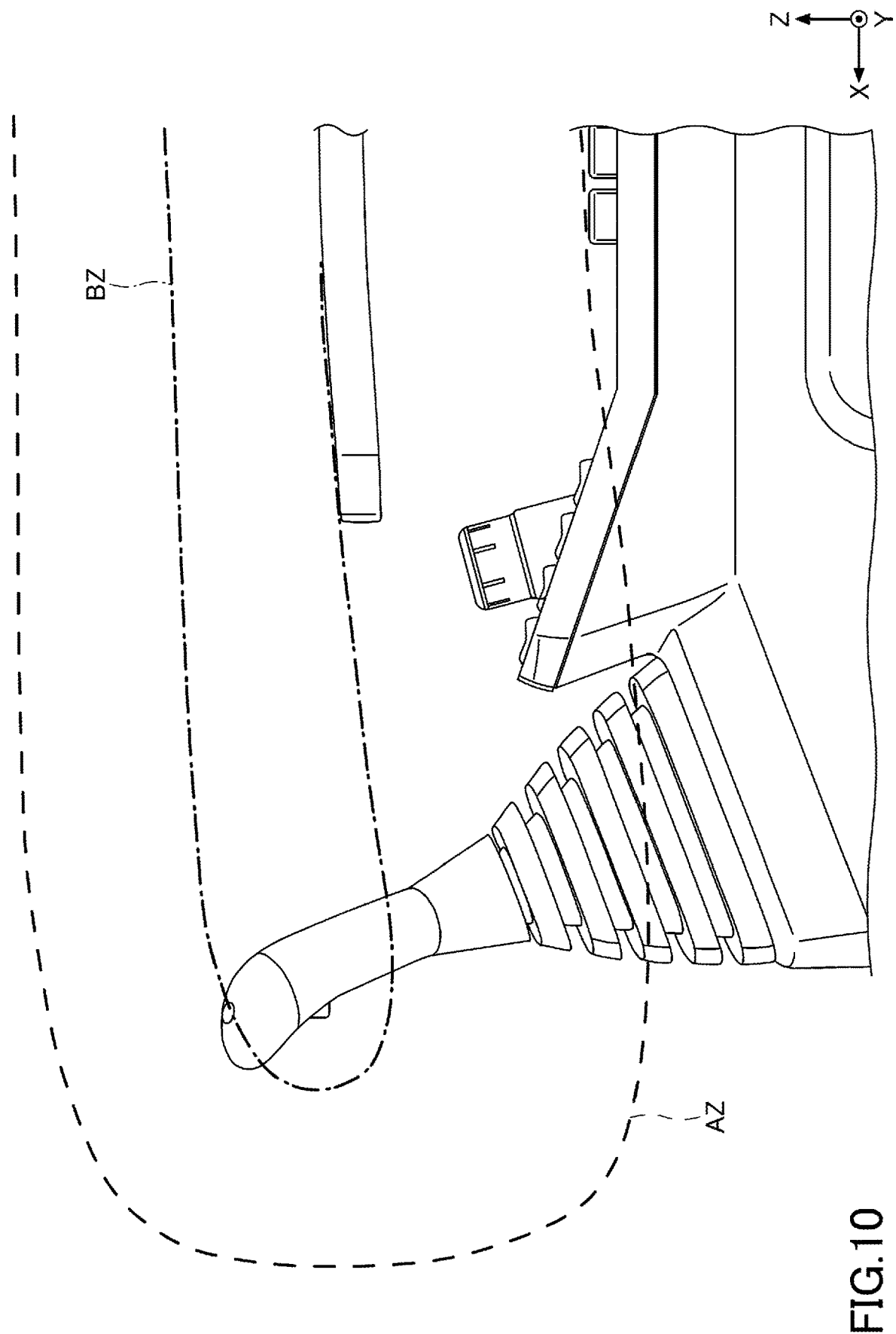
FIG. 10 is a side view illustrating the switch panel and its vicinity.

FIGS. 9 and 10 illustrate an example of the reachable range AZ. FIG. 9 is a top view illustrating the switch panel 41 and its vicinity. FIG. 10 is a side view illustrating the switch panel 41 and its vicinity. In FIGS. 9 and 10, the reachable range AZ is a three-dimensional spatial region that is preset to encompass an arm range BZ. The arm range BZ is a three-dimensional spatial region that is preset as a region where a right arm of the operator seated in the operator's seat 100 is positioned. In FIGS. 9 and 10, for clarity, the reachable range AZ is represented by a dashed line, and the arm range BZ is represented by a dot-dash line.

In the examples illustrated in FIGS. 9 and 10, the reachable range AZ and the arm range BZ are ranges that are similar to each other. However, the reachable range AZ and the arm range BZ may be ranges that are dissimilar to each other.

The switch, which is disabled when the operating lever is operated, may be a switch within the reachable range AZ. In this case, the switches outside the reachable range AZ may be configured not to be disabled even when the operating lever is operated. Also, as described above, the switch within the reachable range AZ may include switches that are not disabled even when the operating lever is operated, such as an emergency stop switch and lever switches.

The switch, which is disabled when the operating lever is operated, is typically located on the console. In the following, the switch located on the console may be referred to as a console switch. The console is typically located on the side of the operator's seat 100. In the example illustrated in FIG. 7, the switch 35, which is disabled when the operating lever is operated, is located on the right console 120B. The right console 120B is located on the right side of the operator's seat 100.

Whether or not the operating lever is operated is typically determined by a controller such as the controller 30.

Also, the switch, which is disabled when the operating lever is operated, is typically a switch used to change the engine speed. In the example illustrated in FIG. 7, the switch 35, which is disabled when the operating lever is operated, is a switch used to switch the output characteristics of the shovel 150.

The shovel 150 typically has a traveling lever. The traveling lever is typically located in the cabin 10. In the examples illustrated in FIGS. 3 and 4, the traveling lever includes a left traveling lever 26E and a right traveling lever 26F. The switch, which is disabled when the operating lever is operated, may be configured to be enabled when the traveling lever is operated but the operating lever is not operated. In other words, the switch may be configured to be enabled when the operating lever is not operated, regardless of whether or not the traveling lever is operated.

A state in which a switch is enabled means, for example, that when the switch is depressed, a function assigned to that switch is executed. In this case, the operator of the shovel 150 can execute the function assigned to the switch 41a (e.g., a function to switch driving speeds) while driving the shovel 150 by, for example, depressing the switch 41a while operating the traveling lever.

Also, the shovel 150 typically has a traveling pedal. The traveling pedal is typically installed in the cabin 10. In the examples illustrated in FIGS. 3 and 4, the traveling pedal includes a left traveling pedal 26C and a right traveling pedal 26D. The switch, which is disabled when the operating lever is operated, may be configured to be enabled when the operating lever is not operated, even in a case of the traveling pedal being operated. In this case, the operator of the shovel 150 can execute a function (e.g., a function to switch driving speeds) assigned to the switch 41a while causing the shovel 150 to travel by, for example, depressing the switch 41a while stepping on the traveling pedal with his or her foot.

When a switch to be disabled is operated when at least one of the left operating lever 26A or the right operating lever 26B is operated, the controller 30 may be configured to disable the switch, and then report that the switch has been operated. That is, the controller 30 may be configured to inform the operator of the shovel 150 that the switch has been operated. For example, the controller 30 may be configured to inform the operator that the switch has been operated and that the function assigned to the switch will not be executed, by at least one of displaying a message on the display device 33, outputting a voice message, outputting an alarm sound, etc. Alternatively, the controller 30 may be configured to output necessary information such that the operator can recognize which switch has been operated when at least one of the left operating lever 26A or the right operating lever 26B is operated.

The present embodiment has been described above with reference to specific examples, however, the present invention is not limited to these specific examples. These specific examples to which a person skilled in the art has made appropriate design changes are also included in the scope of the invention as long as those examples have the features of the present invention. Each element and its arrangement, condition, shape, etc., disposed in each of the aforementioned specific examples are not limited to those illustrated above and may be changed accordingly. The elements contained in each of the aforementioned examples may be combined as appropriate, unless technical inconsistencies arise.

For example, in the above embodiment, the controller 30 is configured such that even when the controller 30 determines that there is an input from the switch, the controller does not perform an operation corresponding to the input of the switch in response to the controller 30 determining that the operating lever is operated. In addition, the controller 30 may be configured such that when the controller 30 determines that the operation pressure sensor 29, which is an example of an operating content detection device, is faulty, the controller does not perform an operation corresponding to the input of the switch. That is, the controller 30 may disable a specific switch. For example, the controller 30 determines that the operation pressure sensor 29 is faulty when the output of the operation pressure sensor 29 indicates an abnormal value. In this case, the controller 30 fixates a target speed of the engine 11 to the initial value such that the target speed cannot be adjusted. Even when the controller 30 determines that there is an input from the switch 35, the controller 30 determines that the operation pressure sensor 29 is faulty. Thus, the controller 30 does not perform the operation corresponding to the input of the switch 35. That is, the controller 30 does not switch the output characteristics of the shovel 150.

When a switch to be disabled is operated after the controller determines that the operating content detection device is faulty, the controller 30 may be configured to disable the switch, and inform the operator of the shovel 150 that the switch has been operated. This configuration is the same as when a switch to be disabled is operated when at least one of the left operating lever 26A or the right operating lever 26B is operated.

The controller 30 may also determine that the operating lever is operated when the controller determines that the operator is gripping the operating lever. In this case, the controller 30 may determine whether the operator is gripping the operating lever based on the output of an electrostatic sensor installed on the surface of the operating lever or the output of a camera installed in the cabin 10 (including the operating lever within the imaging range). That is, "whether or not the operating lever is operated" may be determined based on the output of the operation pressure sensor 29 or a sensor that detects the tilt angle of the operating lever, or based on the output of an electrostatic sensor or a camera, etc. That is, "whether or not the operating lever is operated" may be determined by determining "whether or not the operating lever is gripped". The controller 30 may then determine whether or not to disable the switch based on the determination result.

In the above embodiment, the switches 41a to 41f are assigned functions different from those assigned to the switches 34, but may be assigned functions the same as those assigned to the switches 34.

In addition, the switch panel 41 may be configured such that its upper surface 45 is flush with the upper surface of the right console 120B. The dial 32 may be configured such that its upper end surface and the upper surface of the right console 120B are parallel to each other.

Figure 11:
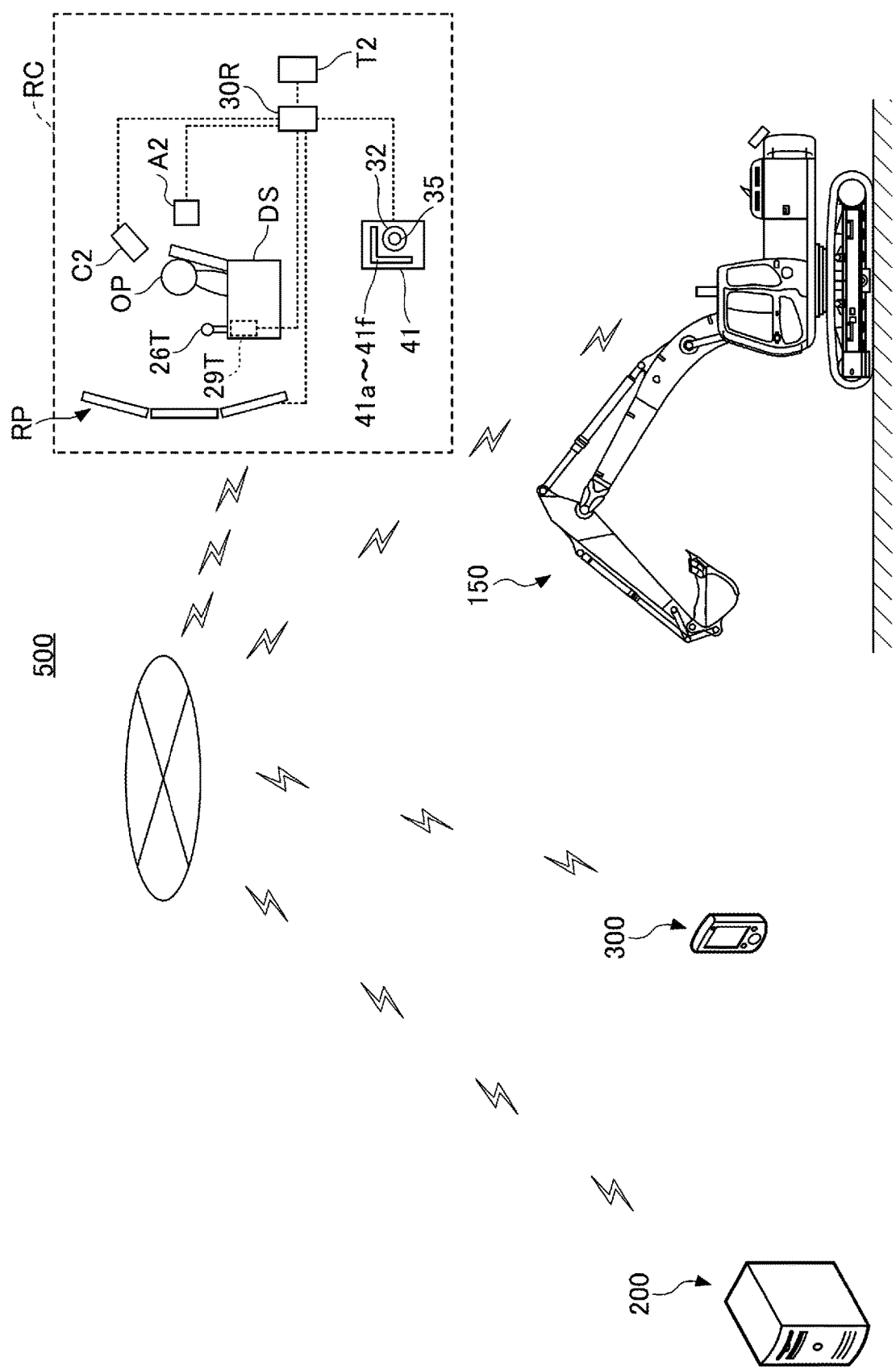
FIG. 11 is a schematic diagram illustrating an example of a construction system.

Also, in the above embodiment, the shovel 150 is configured to be operated by an operator seated in the operator's seat 100 in the cabin 10. However, the shovel 150 may be a remotely operated shovel. FIG. 11 is a schematic diagram illustrating an example of a construction system 500 that includes a shovel 150 acting as a remotely operated shovel. As illustrated in FIG. 11, the construction system 500 includes a shovel 150, a management device 200, and a support device 300. The construction system 500 is configured to support construction with one or more shovels 150.

The information acquired by the shovel 150 may be shared with a manager and other shovel operators, etc., through the construction system 500. The number of the shovels 150, the number of management devices 200, and the number of support devices 300 that constitute the construction system 500 may each be one, or two or more. In the example illustrated in FIG. 11, the construction system 500 includes one shovel 150, one management device 200, and one support device 300.

The management device 200 is typically a fixed terminal device, such as a server computer (so-called cloud server) installed in a management center or the like outside a construction site. The management device 200 may be, for example, an edge server set at a construction site. The management device 200 may also be a portable terminal device (e.g., a laptop computer terminal, a tablet terminal, or a mobile terminal such as a smartphone).

The support device 300 is typically a portable terminal device, such as a laptop computer terminal, a tablet terminal or a smart phone carried by a worker at a construction site. The support device 300 may be a portable terminal carried by an operator of the shovel 150. The support device 300 may be a fixed terminal device.

At least one of the management device 200 or the support device 300 may be provided with a monitor and a remote-control operating device. In this case, an operator using the management device 200 or the support device 300 may operate the shovel 150 while using the remote-control operating device. The remote-control operating device is communicatively connected to the controller 30 mounted on the shovel 150 through, for example, a wireless communication network such as a near field communication network, a mobile communication network, or a satellite communication network. The remote-control operating device may be configured to communicate directly with the controller 30 mounted on the shovel 150.

In addition, various information images (e.g., image information representing the surroundings of the shovel 150, various setting screens, etc.) displayed on a display device 33 installed in the cabin 10 may be displayed by a display device connected to at least one of the management device 200 or the support device 300. The image information representing the surroundings of the shovel 150 may be generated based on a captured image of a spatial recognition device (e.g., a camera or LIDAR) attached to the shovel 150. Thus, a manager using the management device 200 or an operator using the support device 300 can remotely operate the shovel 150 or make various settings relating to the shovel 150 while checking the surroundings of the shovel 150.

For example, in the construction system 500, the controller 30 of the shovel 150 may transmit various information to at least one of the management device 200 or the support device 300. In this case, the controller 30 may transmit an image captured by the spatial recognition device to at least one of the management device 200 or the support device 300. In addition, the controller 30 may transmit information relating to at least one of the shovels 150, such as data on the operation of the shovel, data on the posture of the shovel 150, and data on the posture of the excavator attachment, to at least one of the management device 200 or the support device 300. Thus, the manager using the management device 200 or the operator using the support device 300 can obtain information relating to the shovel 150.

Thus, the construction system 500 allows information relating to the shovel 150 to be shared with the manager and other shovel operators, etc.

As illustrated in FIG. 11, the communication device mounted on the shovel 150 may be configured to transmit and receive information to and from a communication device T2 installed in a remote control room RC via wireless communication. In the example illustrated in FIG. 11, the communication device mounted on the shovel 150 and the communication device T2 are configured to transmit and receive information via a 5th generation mobile communication line (5G line), an LTE line, a satellite line, etc.

In the remote control room RC, a remote controller 30R, a sound output device A2, an indoor imaging device C2, a display device RP, the communication device T2, etc., are installed. The remote control room RC is also equipped with an operator's seat DS where an operator OP, who operates the shovel 150 remotely, is seated.

The remote controller 30R is an arithmetic unit (electronic circuit) that performs various operations. In the example illustrated in FIG. 11, the remote controller 30R, like the controller 30, includes a computer including a CPU, a RAM, and a ROM. Various functions of the remote controller 30R are provided, for example, by the CPU executing a program stored in the ROM.

The sound output device A2 is configured to output sound. In the example illustrated in FIG. 11, the sound output device A2 is a speaker and is configured to reproduce sounds collected by a sound collector (Not illustrated) attached to the shovel 150.

The indoor imaging device C2 is configured to image inside the remote control room RC. In the example illustrated in FIG. 11, the indoor imaging device C2 is a camera installed inside the remote control room RC and configured to image the operator OP seated in the operator's seat DS.

The communication device T2 is configured to control wireless communication with the communication device attached to the shovel 150.

In the example illustrated in FIG. 11, the operator's seat DS has a similar structure to that of the operator's seat 100 installed in the cabin 10 of a normal shovel. Specifically, a left console is located on the left side of the operator's seat DS, and a right console is located on the right side of the operator's seat DS. A left operating lever is located at a front part of the left console, and a right operating lever is located at a front part of the right console. A traveling lever and a traveling pedal are arranged in front of the operator's seat DS. In addition, a switch panel 41, which includes a dial 32 and switches 41a to 41f, is located at the top center of the right console. The dial 32 is provided with a switch 35. Each of the left operating lever, the right operating lever, the traveling lever, the traveling pedal, and the dial 32 constitutes an operating device 26T.

The operating device 26T is equipped with an operation sensor 29T configured to detect an operating content of the operating device 26T. The operation sensor 29T is, for example, an inclination sensor that detects an inclination angle of the operating lever or an angle sensor that detects a rocking angle of the operating lever around a rocking axis. The operation sensor 29T may include other sensors such as a pressure sensor, a current sensor, a voltage sensor, or a distance sensor. The operation sensor 29T outputs information relating to the operating content of the detected operating device 26T to the remote controller 30R. The remote controller 30R generates an operation signal based on the received information and transmits the generated operation signal to the shovel 150. The operation sensor 29T may be configured to generate an operating signal. In such a case, the operation sensor 29T may output the operation signal to the communication device T2 without going through the remote controller 30R.

The display device RP is configured to display information relating to the surroundings of the shovel 150. In the example illustrated in FIG. 11, the display device RP is a multi-display consisting of nine monitors arranged in three vertical rows and three horizontal columns, configured to display a state of the space in front, to the left, and to the right of the shovel 150. Each monitor is a liquid crystal monitor or an organic EL monitor. However, the display device RP may consist of one or more curved monitors, or may consist of a projector.

The display device RP may be a display device wearable by the operator OP. For example, the display device RP is a head-mounted display, and may be configured to transmit and receive information to and from the remote controller 30R via wireless communication. The head-mounted display may be wired to the remote controller. The head-mounted display may be a transparent head-mounted display or a non-transparent head-mounted display. The head-mounted display may be a monocular head-mounted display or a binocular head-mounted display.

The display device RP is configured to display an image that enables the operator OP in the remote control room RC to view the surroundings of the shovel 150. That is, the display device RP displays an image such that even though the operator is in the remote control room RC, he or she can check a situation around the shovel 150 as if he or she were in the cabin 10 of the shovel 150.

It should be understood that the invention is not limited to the above-described embodiment, but may be modified into various forms on the basis of the spirit of the invention. Additionally, the modifications are included in the scope of the invention.

DESCRIPTION OF THE REFERENCE NUMERALS

1 lower traveling body
1A left traveling hydraulic motor
1B right traveling hydraulic motor
2 turning mechanism
2A turning hydraulic motor
3 upper turning body
4 boom
5 arm
6 bucket
7 boom cylinder
8 arm cylinder
9 bucket cylinder
10 cabin
11 engine
13 regulator
14 main pump
15 pilot pump
17 control valve unit
18 throttle
19 control pressure sensor
26, 26T operating device
26A left operating lever
26B right operating lever
26C left traveling pedal
26D right traveling pedal
26E left traveling lever
26F right traveling lever
27 lever boot
28 discharge pressure sensor
29 operation pressure sensor
29T operation sensor
30 controller
30R remote controller
32 dial
33 display device
34, 35 switch
40 center bypass line
41 switch panel
41a to 41f switch
48al, 48ar lower switch
48bl, 48br trigger switch
48cl, 48cr right switch
48dl, 48dr left switch
52 parallel line
100 operator's seat
102 seat
104 backrest
106A left armrest
106B right armrest
107 front end
120A left console
120B right console
140 gate lock lever
150 shovel
171 to 176 control valve
200 management device
300 support device
500 construction system
A2 sound output device
C2 indoor imaging device
DS operator's seat
OP operator
RC remote control room
RP display device
T2 communication device

What is claimed is:

1. A shovel comprising:
a lower traveling body;
an upper turning body turnably mounted on the lower traveling body;
a cabin mounted on the upper turning body;
an operator's seat installed in the cabin;
a hydraulic actuator;
an operating lever installed in the cabin and configured to be operated to move the hydraulic actuator;
a gate lock lever configured to switch the hydraulic actuator between an operable state and an inoperative state;
a switch installed in the cabin; and
a hardware processor configured to disable the switch in response to determining that the operating lever is operated while the hydraulic actuator is switched to the operable state by the gate lock lever.

2. The shovel according to claim 1, further comprising:
a console located at a side of the operator's seat; and
an arm rest located at the same side of the operator's seat as the console,
wherein the switch is disposed on an upper surface of the console between the operating lever and the arm rest in a longitudinal direction of the operator's seat.

3. The shovel according to claim 1,
wherein the hardware processor is configured to determine whether the operating lever is operated.

4. The shovel according to claim 1, wherein the switch is configured to change an engine speed.

5. The shovel according to claim 1, further comprising:
a traveling lever installed in the cabin, wherein
the switch is configured to be enabled when the operating lever is not operated, regardless of whether or not the traveling lever is operated.

6. The shovel according to claim 1, wherein
the switch is located within reach of an operator seated in the operator's seat.

7. The shovel according to claim 1, wherein
the switch includes a dial switch.

8. The shovel according to claim 7, wherein
the dial switch is not provided with a scale.

9. The shovel according to claim 1, wherein
when the switch that has been disabled receives an operation while the operating lever is operated, the disabled switch being operated is reported.

10. The shovel according to claim 1, further comprising:
a different switch configured not to be disabled regardless of whether or not the operating lever is being operated.

11. The shovel according to claim 10, wherein the different switch is an emergency stop switch.

12. The shovel according to claim 1, wherein the switch is selectively set in advance.

13. The shovel according to claim 1, further comprising:
another switch configured not to be disabled when the operating lever is operated, wherein the switch includes a console switch, and
said another switch includes a lever switch.

14. The shovel according to claim 1, wherein the hardware processor is configured to enable the switch in response to determining that the operating lever is not operated while the hydraulic actuator is switched to the operable state by the gate lock lever.

15. An operating device for a shovel, the shovel including a lower traveling body, an upper turning body turnably mounted on the lower traveling body, a hydraulic actuator, and a gate lock lever configured to switch the hydraulic actuator between an operable state and an inoperative state, the operating device comprising:
an operating lever configured to be operated to move the hydraulic actuator:
a switch installed in a Vicinity of the operating lever; and
a hardware processor configured to disable the switch in response to determining that the operating lever is operated while the hydraulic actuator is switched to the operable state by the gate lock lever.

16. The operating device according to claim 15, wherein the hardware processor is configured to enable the switch in response to determining that the operating lever is not operated while the hydraulic actuator is switched to the operable state by the gate lock lever.

* * * * *